United States Patent
Christmann

(10) Patent No.: US 8,984,963 B2
(45) Date of Patent: Mar. 24, 2015

(54) ROTATABLE TORQUE-MEASURING APPARATUS AND METHOD

(71) Applicant: H. Aaron Christmann, Saint Paul, MN (US)

(72) Inventor: H. Aaron Christmann, Saint Paul, MN (US)

(*) Notice: Subject to any disclaimer, the term of this patent is extended or adjusted under 35 U.S.C. 154(b) by 0 days.

(21) Appl. No.: 13/844,769

(22) Filed: Mar. 15, 2013

(65) Prior Publication Data

US 2014/0260682 A1 Sep. 18, 2014

(51) Int. Cl.
*G01D 7/00* (2006.01)
*G01L 3/10* (2006.01)

(52) U.S. Cl.
CPC ........................... *G01L 3/10* (2013.01)
USPC ................................. 73/862.041; 73/862.045

(58) Field of Classification Search
CPC ...... G01L 1/2231; G01L 1/2218; G01N 3/22; B21C 1/00
USPC ..................... 73/862.041–862.046, 862.191
See application file for complete search history.

(56) References Cited

U.S. PATENT DOCUMENTS

| | | | |
|---|---|---|---|
| 4,573,362 A * | 3/1986 | Amlani .................... | 73/862.045 |
| 4,763,531 A | 8/1988 | Dietrich et al. | |
| 4,821,582 A * | 4/1989 | Meyer et al. ............. | 73/862.045 |
| 5,031,455 A | 7/1991 | Cline | |
| 5,065,633 A | 11/1991 | Mercat | |
| 6,418,797 B1 | 7/2002 | Ambrosina et al. | |
| 6,694,828 B1 | 2/2004 | Nicot | |
| 7,743,672 B2 * | 6/2010 | Kurtz et al. ............... | 73/862.046 |
| 7,775,128 B2 | 8/2010 | Roessingh et al. | |
| 8,141,438 B2 | 3/2012 | Roessingh et al. | |
| 8,418,570 B2 | 4/2013 | Maehara | |
| 8,650,972 B2 | 2/2014 | Kitamura | |
| 2005/0275561 A1 | 12/2005 | Kolda et al. | |
| 2009/0120208 A1 * | 5/2009 | Meyer ...................... | 73/862.045 |
| 2013/0049447 A1 | 2/2013 | Kitamura | |
| 2014/0260684 A1 * | 9/2014 | Christmann ............. | 73/862.325 |

FOREIGN PATENT DOCUMENTS

WO   WO 2011069515 A3 * 8/2012

OTHER PUBLICATIONS

"PCT Search Report/Written Opinion for related PCT/US2014/030011 application, mailed Aug. 11, 2014, 12 pages."

* cited by examiner

*Primary Examiner* — Max Noori
(74) *Attorney, Agent, or Firm* — Charles A. Lemaire; Jonathan M. Rixen; Lemaire Patent Law Firm, P.L.L.C.

(57) ABSTRACT

A torque-measurement device that has a rotational axis, and wherein the torque-measurement device includes an inner tubular structure, an outer tubular structure, and a plurality of ribs that each have a length dimension in a rib-length direction parallel to the rotational axis, a rib-width dimension in a width direction perpendicular to the length direction and extending radially rotational axis, and a minimum rib-thickness dimension in a thickness direction perpendicular to the length direction and perpendicular to the width direction, wherein the length dimension is greater than the width dimension and the width dimension is greater than the thickness dimension, wherein each of the plurality of ribs has a center plane that lies in the rib-length direction and the rib-width direction, and wherein a torque applied between the inner tubular structure and the outer tubular structure results in an angular displacement of inner tubular structure relative to the outer tubular structure.

20 Claims, 23 Drawing Sheets

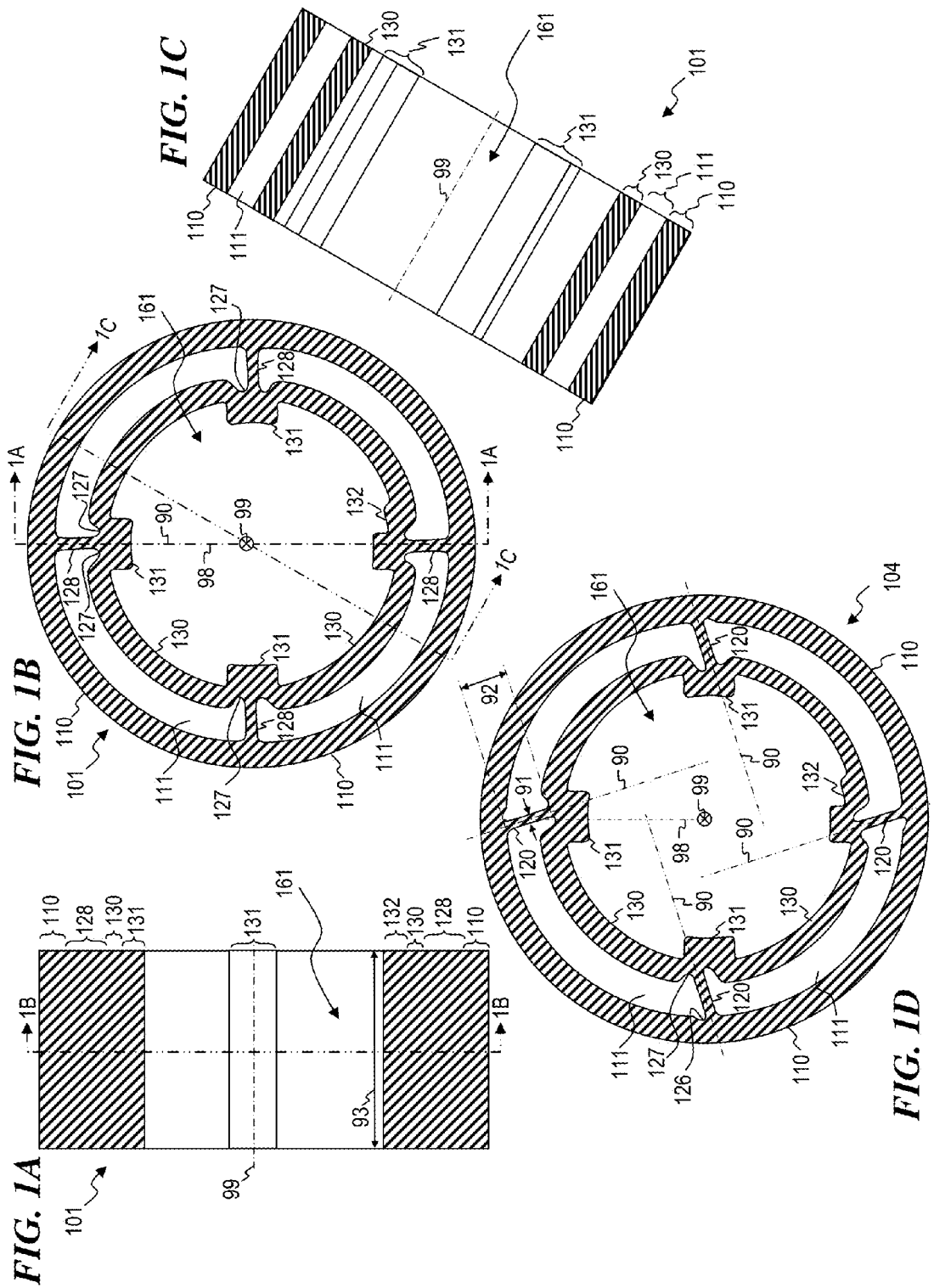

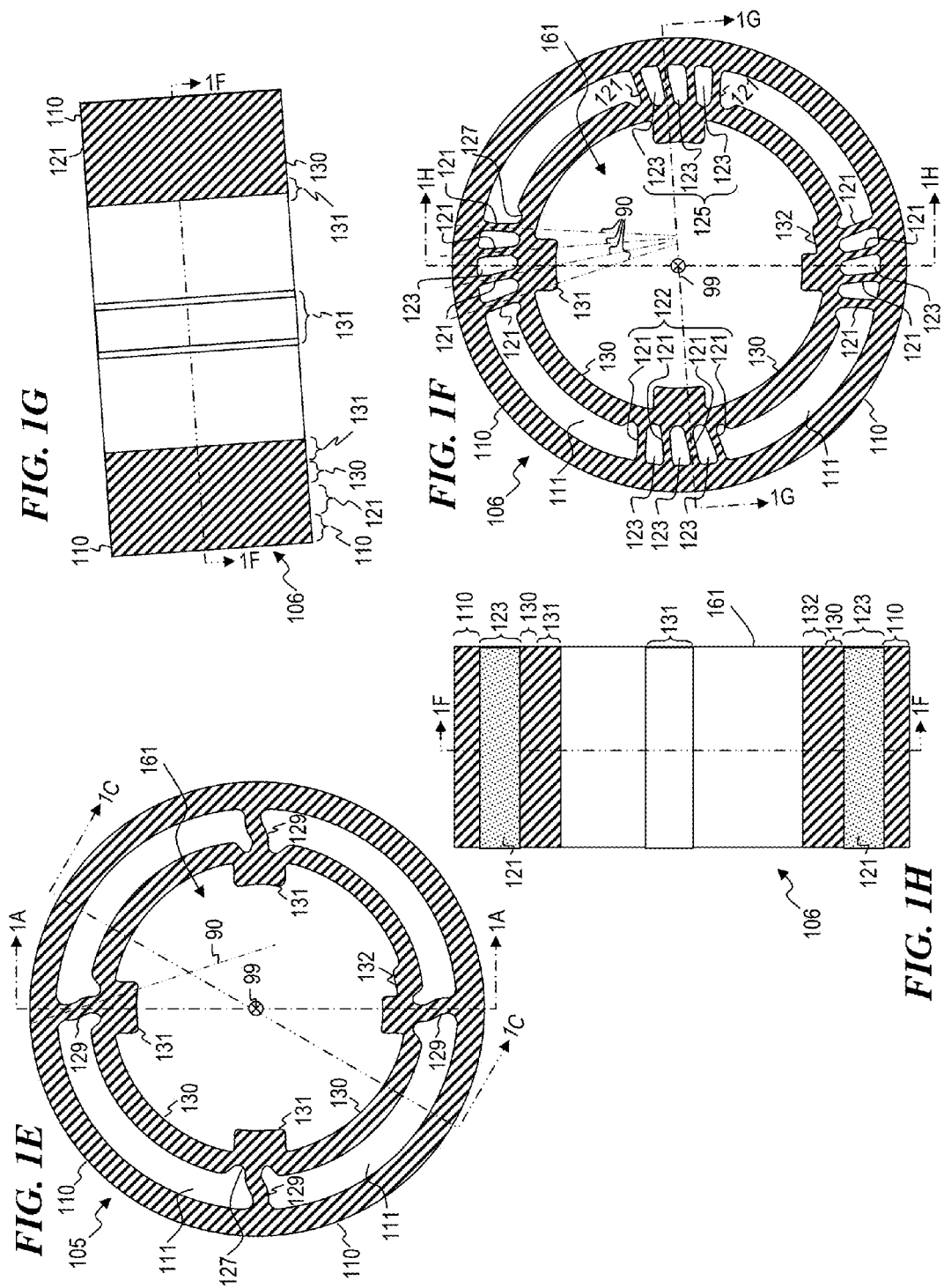

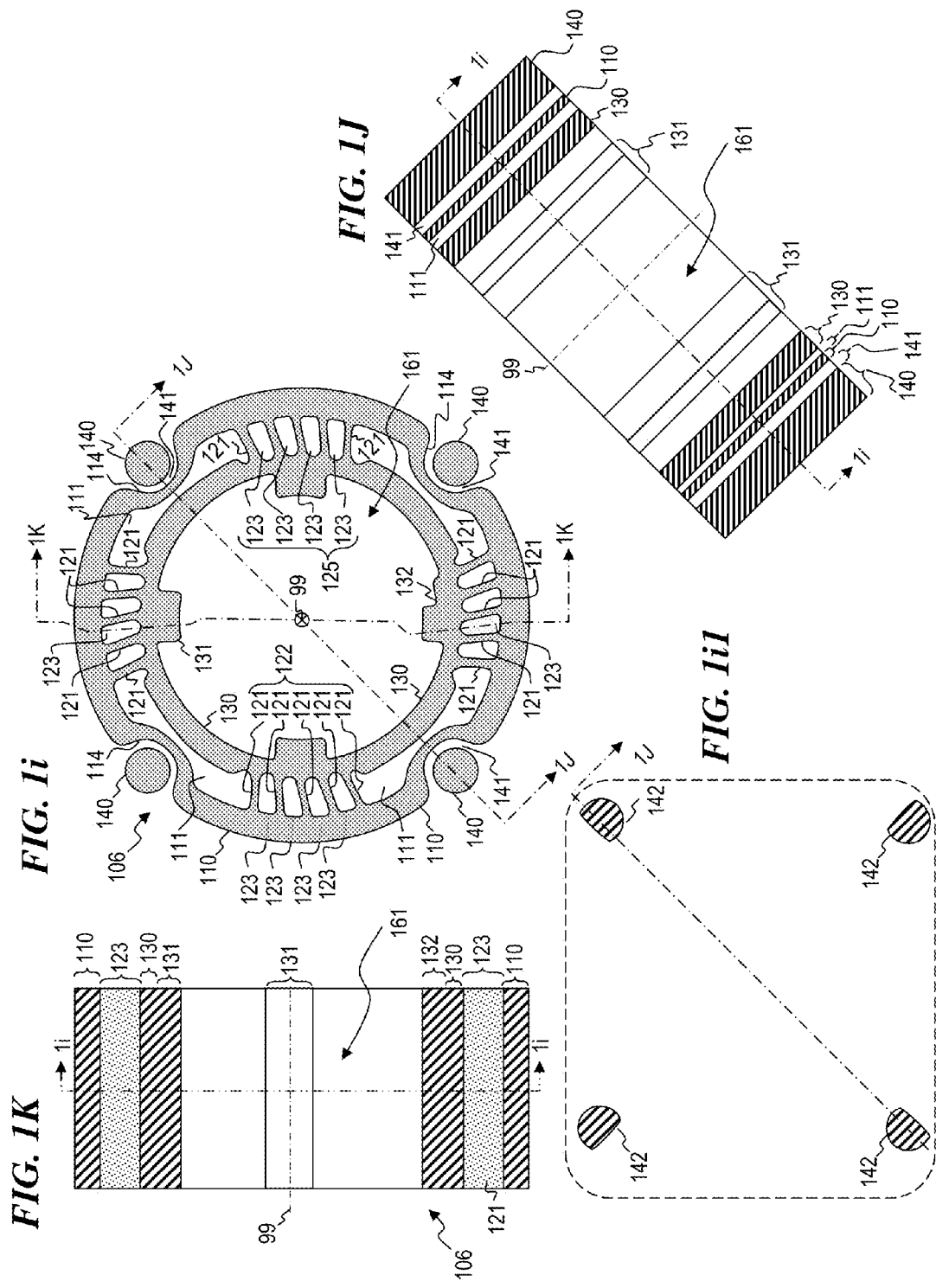

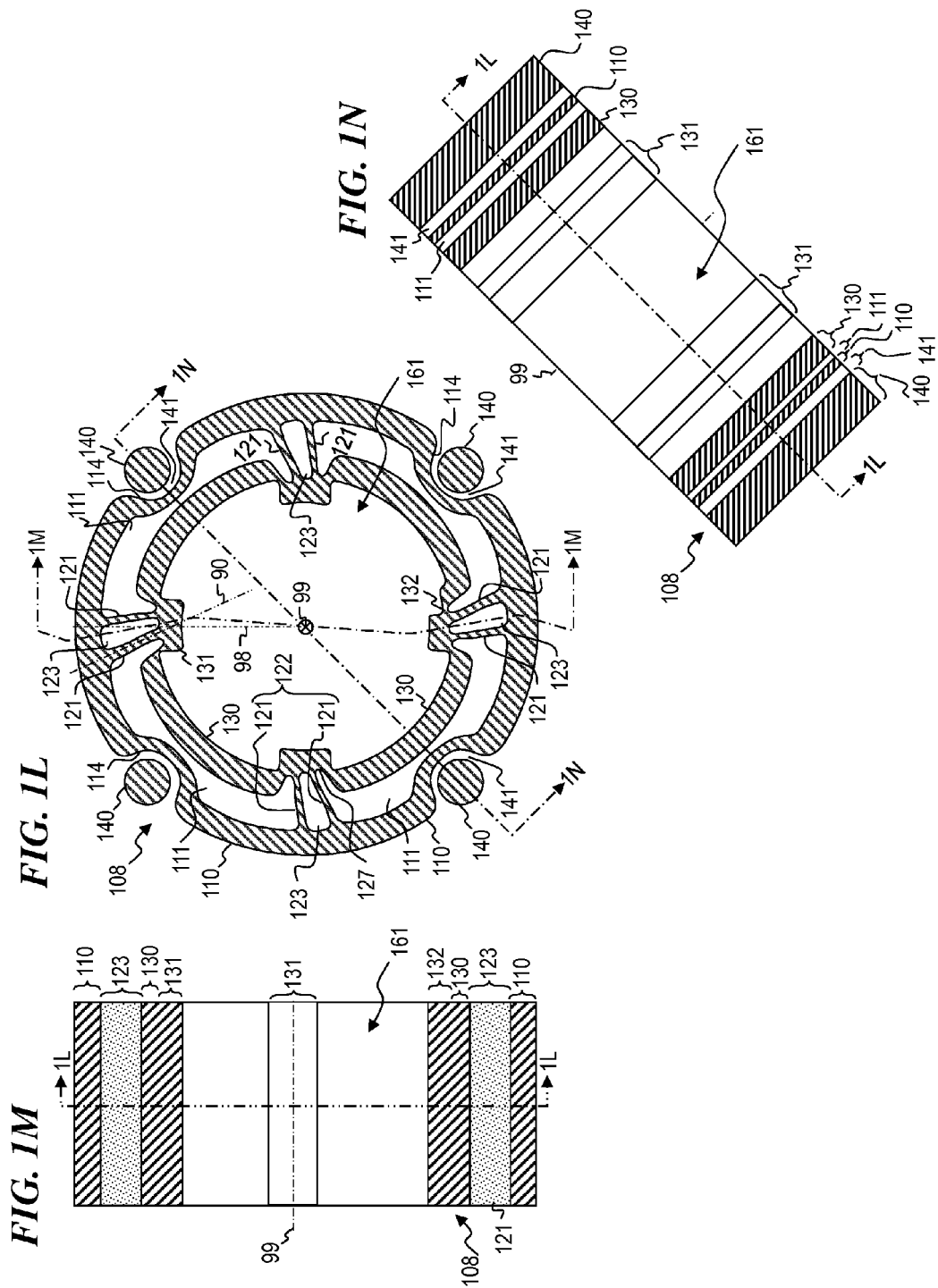

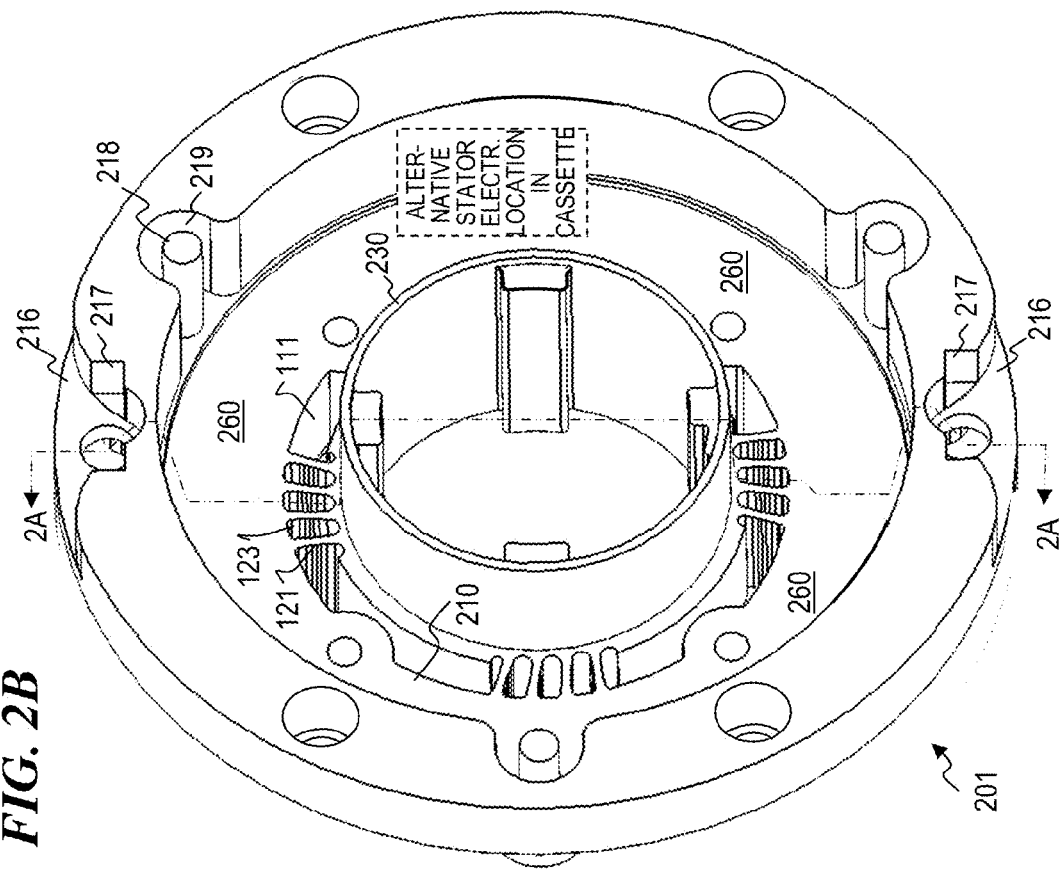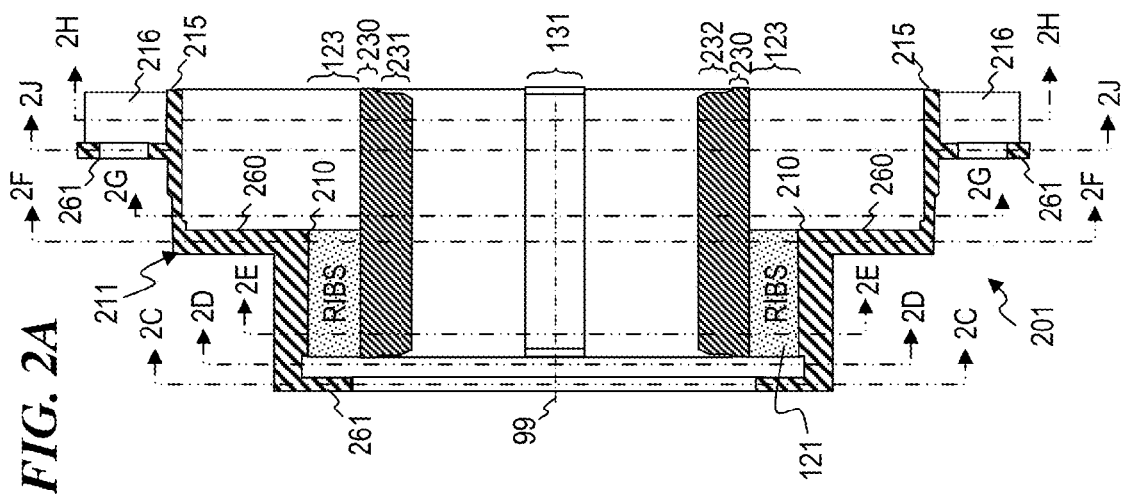

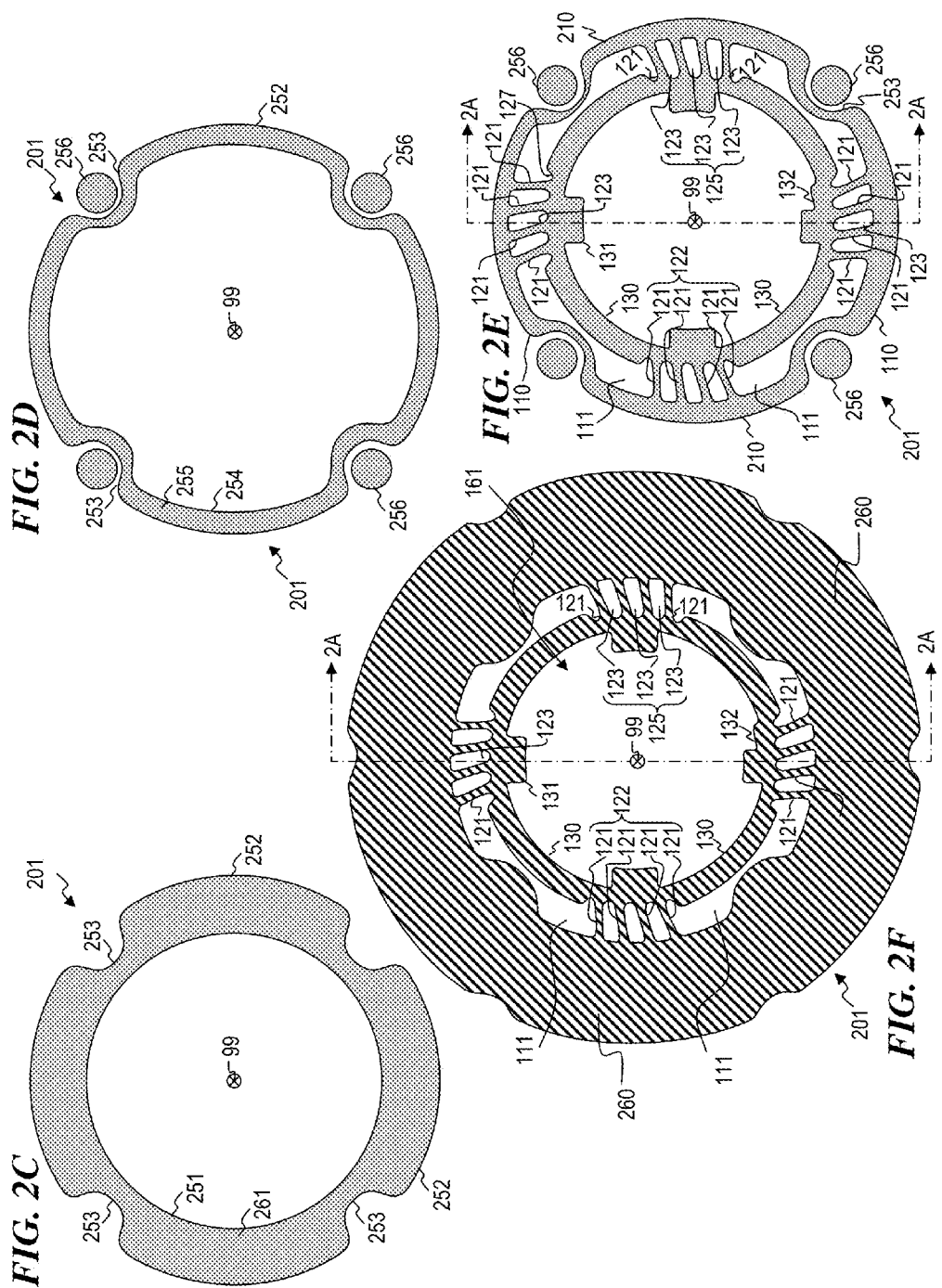

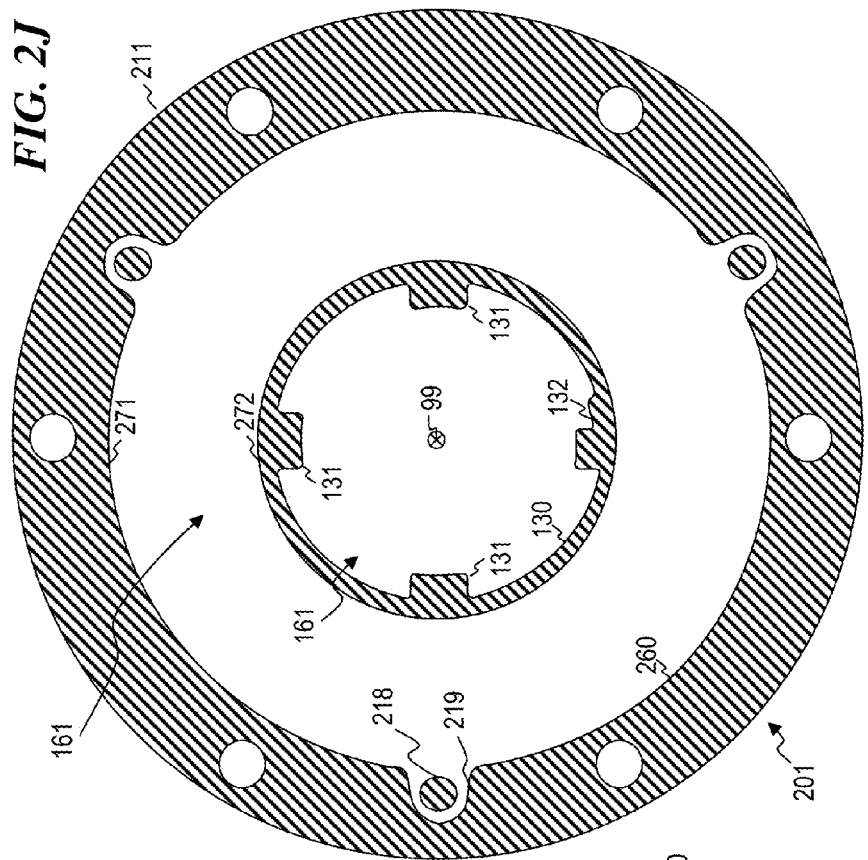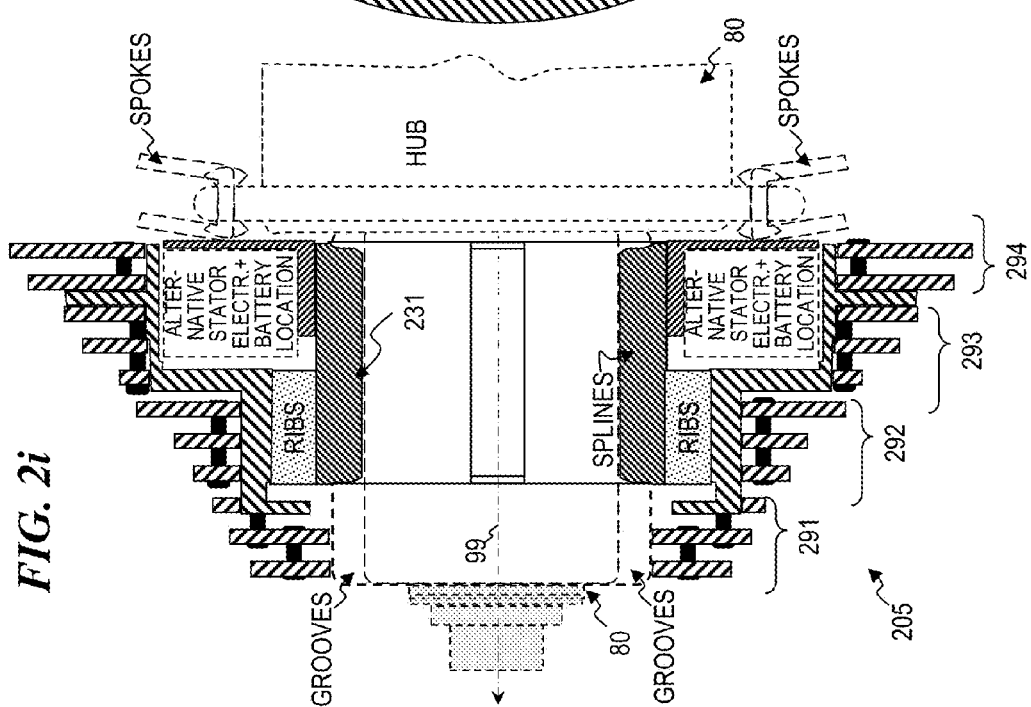

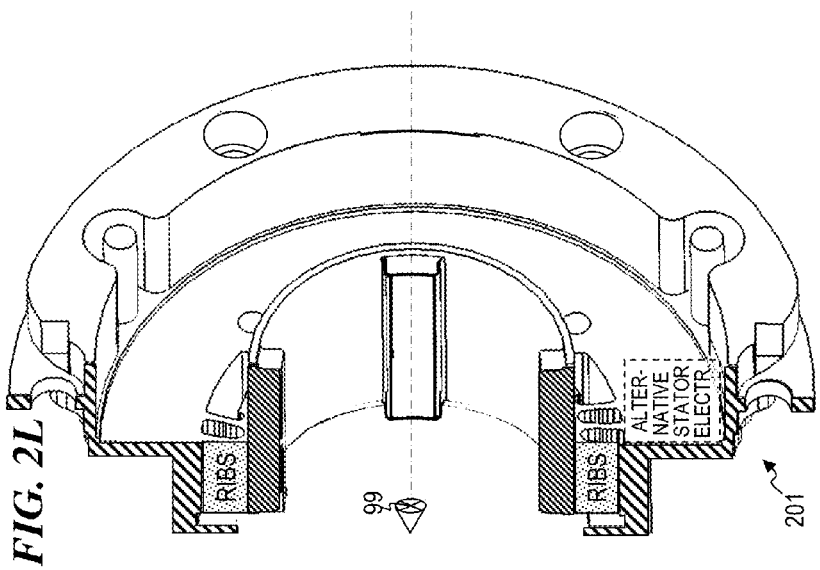
*FIG. 2L*
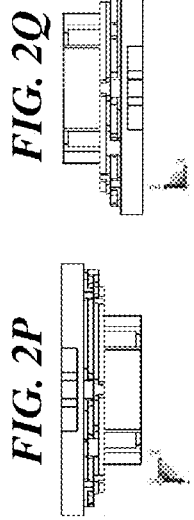
*FIG. 2Q*
*FIG. 2P*
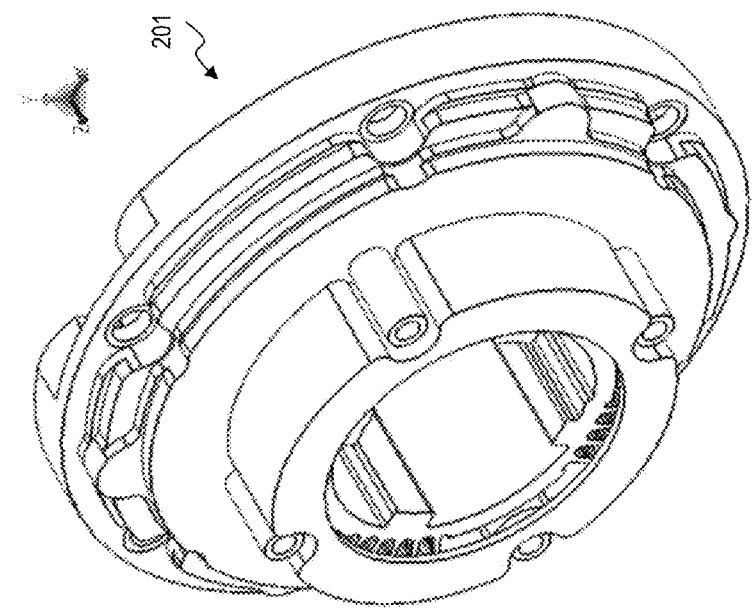
*FIG. 2K*
*FIG. 2O*
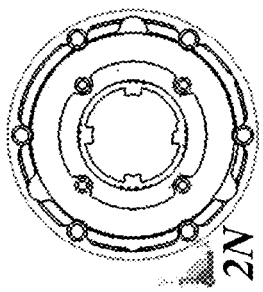
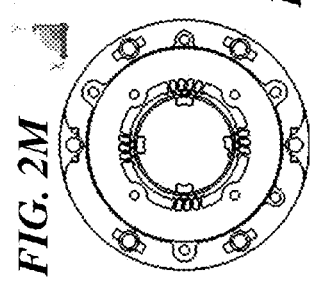
*FIG. 2M*
*FIG. 2N*

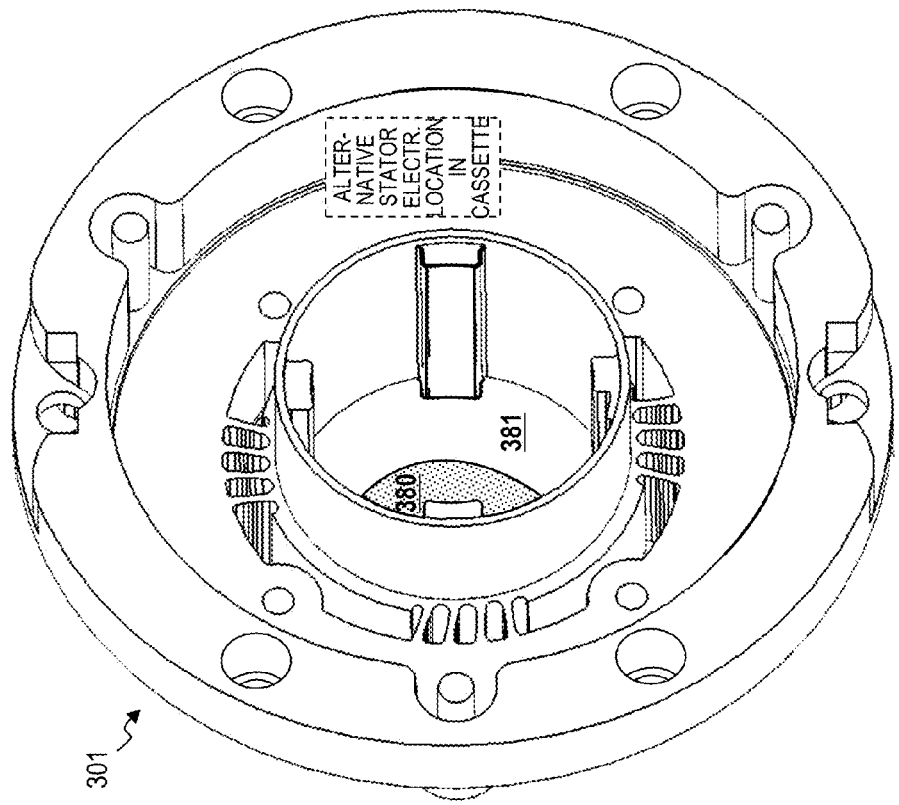
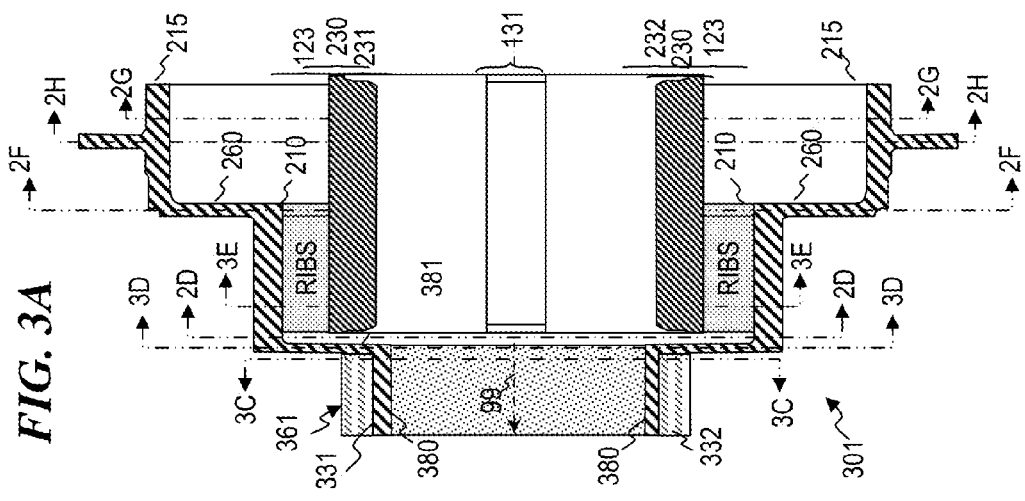

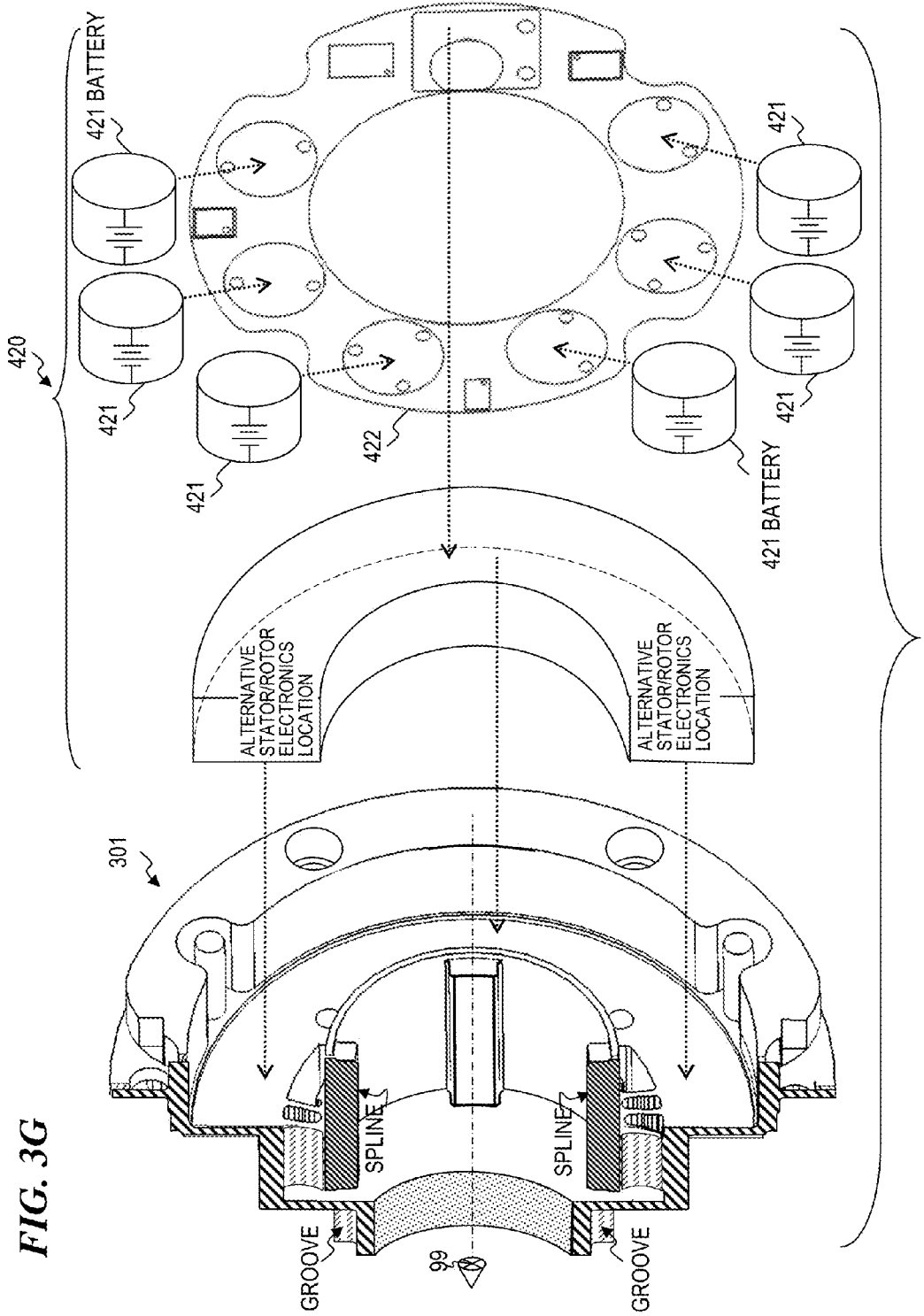

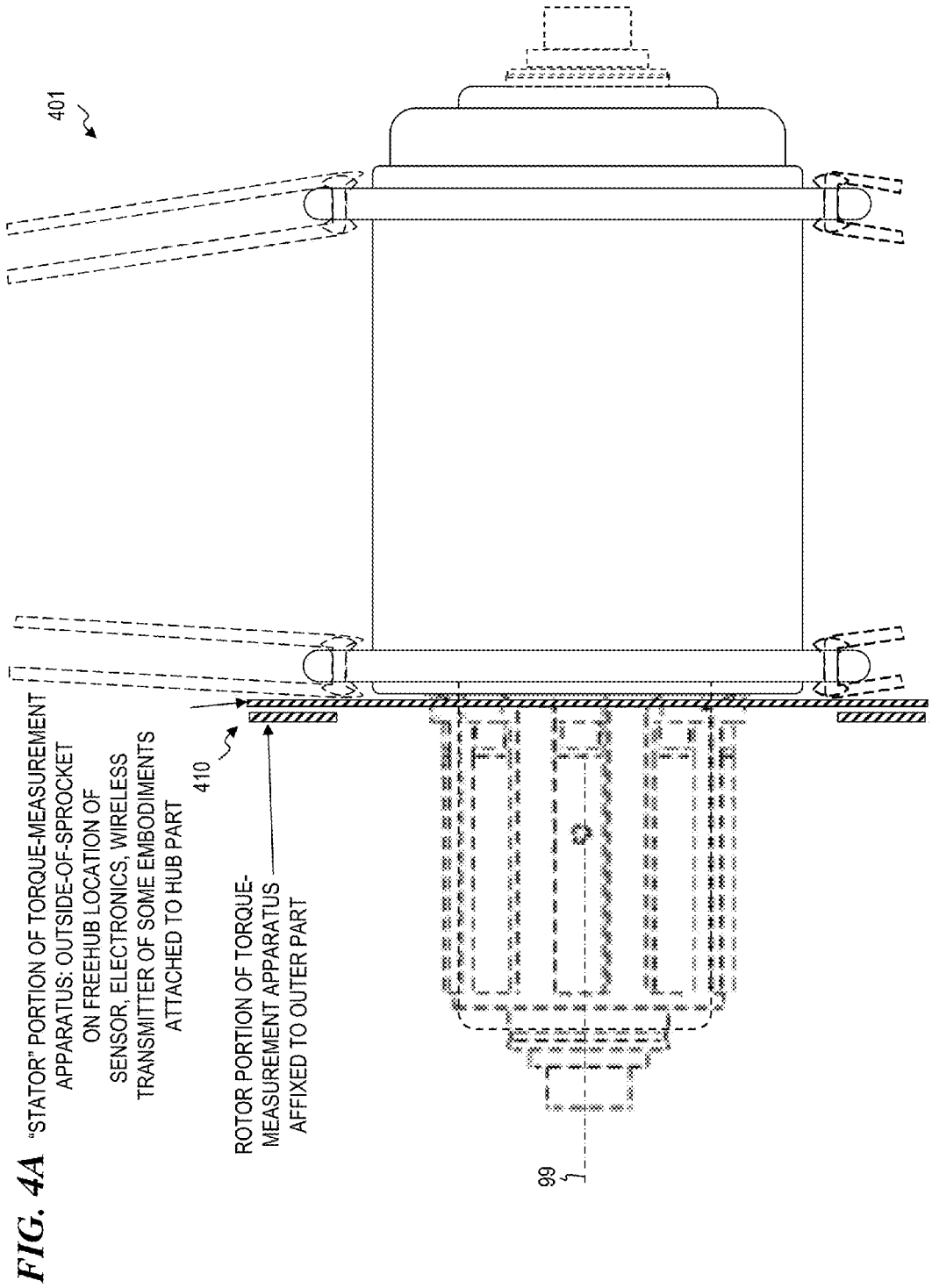
FIG. 4A "STATOR" PORTION OF TORQUE-MEASUREMENT APPARATUS: OUTSIDE-OF-SPROCKET ON FREEHUB LOCATION OF SENSOR, ELECTRONICS, WIRELESS TRANSMITTER OF SOME EMBODIMENTS ATTACHED TO HUB PART
ROTOR PORTION OF TORQUE-MEASUREMENT APPARATUS AFFIXED TO OUTER PART

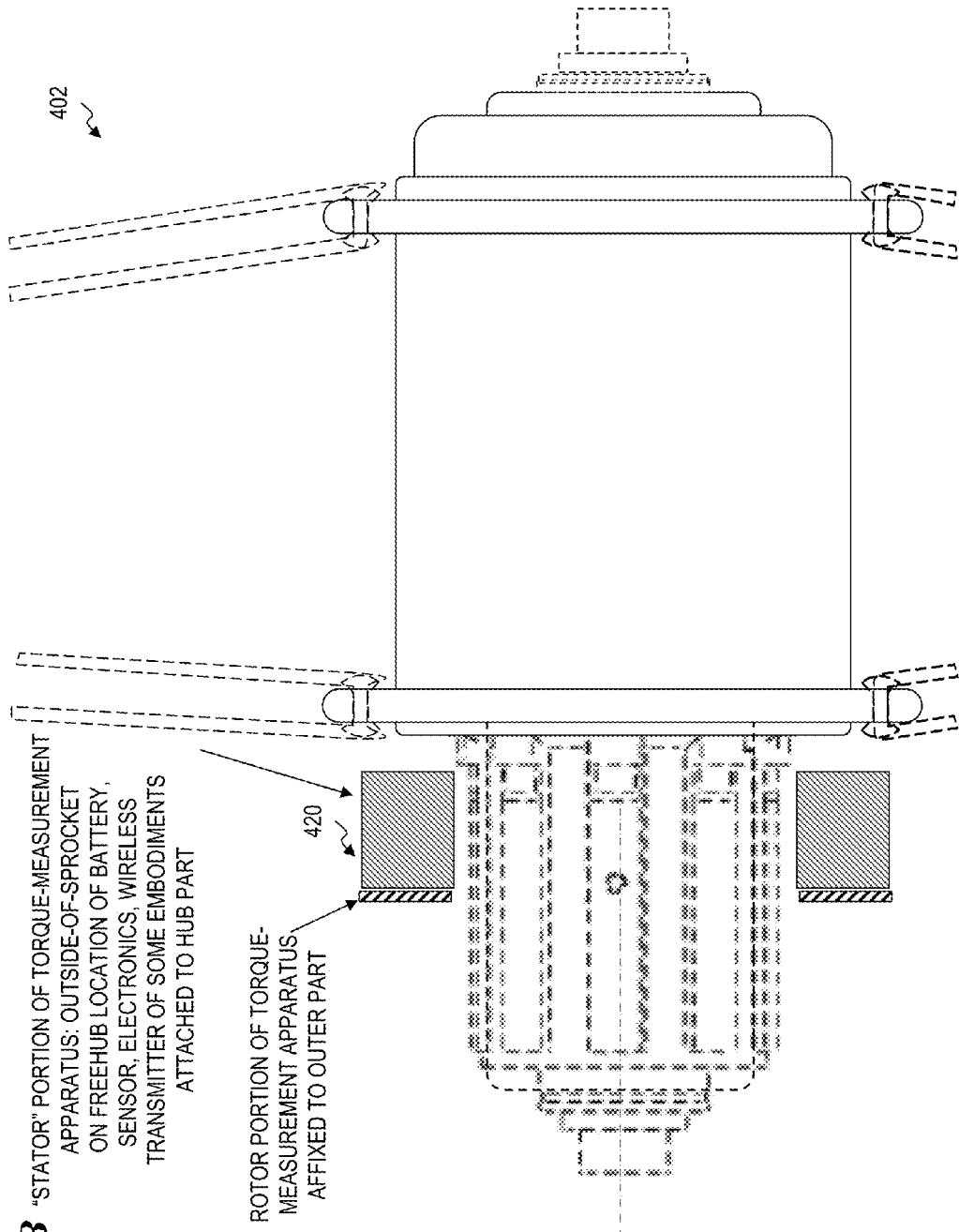

SINGLE-PIECE SPROCKET
CASSETTE ASSEMBLY

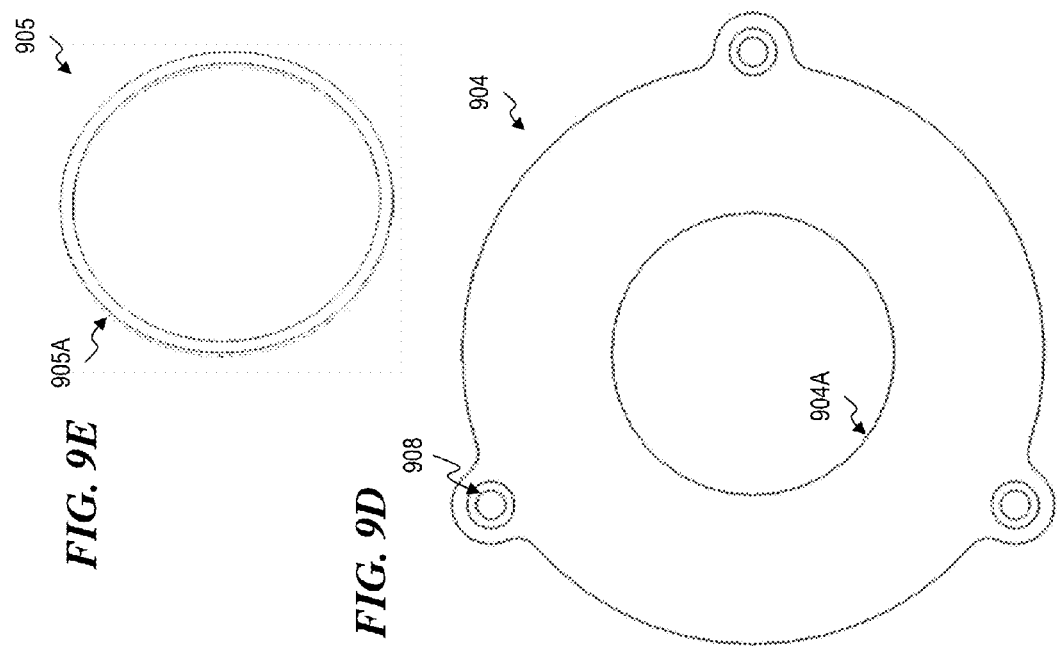
FIG. 9E
FIG. 9D
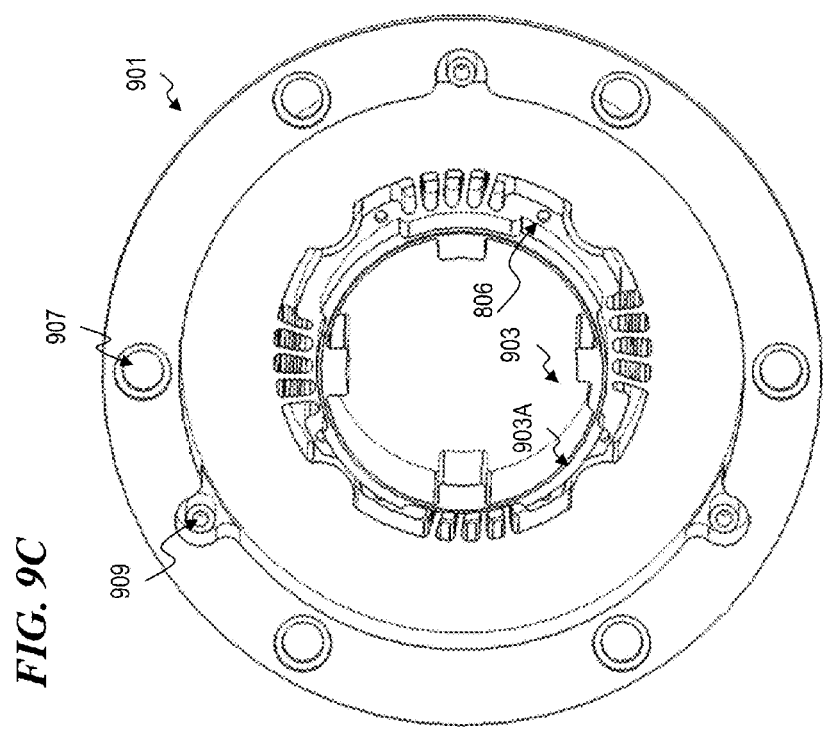
FIG. 9C

ROTATABLE TORQUE-MEASURING APPARATUS AND METHOD

FIELD OF THE INVENTION

This invention relates generally to the technical field of torque sensors and torque sensing, and more particularly, to a method and apparatus of for measuring a torque applied to a shaft, wherein one use of the apparatus is to measure torque, power, and/or energy applied by a rider of a bicycle, and wherein that apparatus includes a cassette holder that fits on a rear-wheel hub (also called a freehub) and that holds one or more sprocket cassettes.

BACKGROUND OF THE INVENTION

There is a growing trend in the bicycling community to use a torque-measuring device mounted to the bicycle that continuously sends information to a display that the rider can easily monitor while riding. The torque-measuring device may compute the torque applied by the bicycle rider to the bicycle drive train. The measured torque may be converted into a power measurement which is shown to the rider on a bicycle computer display.

U.S. Pat. No. 7,775,128 to Roessingh, et al. issued Aug. 17, 2010 with the title "Cassette-based power meter," and is incorporated herein by reference. In U.S. Pat. No. 7,775,128, Roessingh, et al. describe a cassette-based power-measuring apparatus having a power-sensing arrangement mounted within a cavity defined by a hollow bicycle sprocket cassette. Their power-sensing arrangement includes a torque-sensing assembly including torque-sensing elements configured to measure a user-applied torque. The torque-sensing elements communicate with an electronics assembly configured to process the measured data and transmit it to a receiver. The torque-sensing assembly may include a torque tube or a series of bending beams secured between a rear plate of the cassette and a freehub. The torque tube or bending beams may include strain gauges bonded thereto for measuring strain induced by application of forces in response to user-applied power.

U.S. Pat. No. 6,694,828 to Nicot issued Feb. 24, 2004 with the title "Torque sensor for a turning shaft," and is incorporated herein by reference. In U.S. Pat. No. 6,694,828, Nicot describes a device having at least one magnetic-field generator placed on a first plane of a right section of a shaft and at least one magnetic-field detector placed in a second plane of a right section of the shaft. The detector produces a signal proportional to the torque following the relative angular shift of the field generator in relation to the detector, the magnetic-field generator having a magnetic structure supported by support mechanisms connected to the turning shaft. The magnetic field detector is located roughly opposite the magnetic field generator and is supported by support mechanisms connected to the turning shaft.

SUMMARY OF THE INVENTION

There remains a need in the art for a torque-measuring, generally tubular device that can be inserted between an inner shaft or hub and an outer structure that delivers or receives a torque force to or from the shaft or hub, and in particular for a sprocket-cassette holder or a sprocket holder that measures torque between the sprocket-cassette or sprocket and the hub of a driven bicycle wheel.

In some embodiments, the present invention includes a sprocket-cassette holder that fits between a bicycle rear-wheel hub (also called a freewheel hub or freehub) and one or more sprockets and/or sprocket. The sprocket-cassette holder may define an outer freehub member and the bicycle rear wheel hub may define an inner freehub member. The sprockets may be assembled and affixed to the outer freehub member singly or in groups in a cassette fashion as may be defined by the shape of the outer freehub member. In some embodiments, the sprocket-cassette holder includes an electrical, optical, mechanical, and/or magnetic displacement-measuring device and circuit used as a torque-measuring sensor. In some embodiments, the displacement-measuring device produces a signal proportional to torque applied by a bicycle rider to a sprocket of the sprocket-cassette holder via a chain by measuring the relative angular displacement of an outer portion of the holder in relation to an inner portion of the holder.

In some embodiments, the displacement-measuring device and circuit are powered by a direct-current (DC) power source, such as one or more batteries, that are located in a cavity inside the sprocket-cassette holder. In some embodiments, the displacement-measuring device and circuit are located in a cavity inside the sprocket-cassette holder. In some embodiments, the outer portion of the sprocket-cassette holder defines the outer freehub member and the inner portion of the holder may define the inner freehub member. In some embodiments, the batteries, the displacement-measuring device, and the circuit may be located between the outer freehub member and the inner freehub member defined by the sprocket-cassette holder.

In some embodiments, the signal is wirelessly transmitted to a receiver unit coupled to a display. In some such embodiments, the display is mounted to the bicycle, while in other embodiments, the display is strapped to the wrist of the bicycle rider. In some embodiments, the display shows a numerical value for one or more parameters (such as torque, power, or energy) determined by the measured torque. In some embodiments, the display shows a graphical representation of the one or more parameters (such as torque, power, or energy) determined by the measured torque. In some embodiments, the graphical representation includes a graph of one or more of the parameters as a function of time for a trip. In some embodiments, the graphical representation of parameters of a current trip is displayed concurrently with graphical representation(s) of parameters of one or more past trips.

In some embodiments, the displacement-measuring device and circuit uses an electrical measurement between parallel plates with a plate affixed to an outer portion of the holder and another plate affixed to an inner portion of the holder. In some embodiments, the displacement-measuring device and circuit uses an optical measurement between a structure affixed to the outer portion of the holder and a structure affixed to the inner portion of the holder.

Referring briefly to FIG. 2A, in some embodiments, the outer portion 211 of the sprocket-cassette holder 201 has a plurality of generally tubular sections 210 and 215 each having a characteristic radial dimension that differs from the characteristic radial dimension of the other generally tubular section(s), wherein each generally tubular section (for example 210) is connected to an adjoining generally tubular section (for example 215) by a connecting wall (for example 260) extending in a radial direction between the generally tubular section having the smaller characteristic radial dimension and the adjoining generally tubular section having the larger characteristic radial dimension. In some embodiments, one or more generally tubular sections (for example 210) stiffened by a wall (for example, 261) extending in a radial direction in a plane that is parallel to the connecting wall (for example 260) on the opposite end of that generally tubular sections (for example 210).

In some embodiments, the sprocket-cassette holder has a plurality of generally tubular sections each having a characteristic radial dimension that differs from the characteristic radial dimension of the other generally tubular sections. Each generally tubular section is connected to an adjoining generally tubular section by one or more connecting wall-like ribs extending in a radial direction between the generally tubular section having the smaller characteristic radial dimension and the adjoining generally tubular section having the larger characteristic radial dimension. The ribs are configured such that their outer edge deflects in a tangential direction when a rotational torque is applied between the outer portion and the inner portion of the sprocket-cassette holder, while the ribs maintain both the outer portion of the sprocket-cassette holder and the inner portion of the sprocket-cassette holder concentric relative to the rotational axis of the freehub.

In some embodiments, the inner portion of the sprocket-cassette holder has at least one generally tubular section having an inner surface configured to stay in a fixed relationship to the freehub of the rear wheel of the bicycle, and an outer surface that is connected, by a plurality of wall-like ribs, to one of the plurality of generally tubular sections of the outer portion. In some embodiments, the inner surface of the sprocket-cassette holder defines an inner freehub member and the outer surface of the holder may define an outer freehub member. In some embodiments, the inner freehub member of the sprocket-cassette holder may fit concentrically onto and be affixed to the freehub of a bicycle wheel. In some embodiments, the outer freehub member of the sprocket-cassette holder may accept one sprocket or groups of sprockets configured to fit concentrically onto and be affixed to the outer freehub member.

BRIEF DESCRIPTION OF THE DRAWINGS

FIG. 1A is a side cross-section view of a torque-measuring cassette holder 101 that uses a plurality of single ribs each having a center plane that passes through a rotational axis of holder 101, as would be seen at section line 1A of FIG. 1B, according to some embodiments of the present invention.

FIG. 1B is an end cross-section view of torque-measuring cassette holder 101 as would be seen at section line 1B of FIG. 1A, according to some embodiments of the present invention.

FIG. 1C is a side cross-section view of torque-measuring cassette holder 101 as would be seen at section line 1C of FIG. 1B, according to some embodiments of the present invention.

FIG. 1D is an end cross-section view of a torque-measuring cassette holder 104 that uses a plurality of single ribs each having a center plane that is offset from a rotational axis of holder 104, according to some embodiments of the present invention.

FIG. 1E is an end cross-section view of a torque-measuring cassette holder 105 that uses a plurality of ribs each having a center plane that is offset from a rotational axis of holder 105 but which are thick enough that a plane that passes through a rotational axis lies within the entire width of the rib, as would be seen at section line 1B of FIG. 1A, according to some embodiments of the present invention.

FIG. 1F is an end cross-section view of a torque-measuring cassette holder 106 that uses a plurality of multi-rib groups, each multi-rib group having a plurality of ribs, wherein each rib has a center plane that is offset from a rotational axis of holder 106, as would be seen at section line 1F of FIG. 1H, according to some embodiments of the present invention.

FIG. 1G is a side cross-section view of torque-measuring cassette holder 106 as would be seen at section line 1G of FIG. 1F, according to some embodiments of the present invention.

FIG. 1H is a side cross-section view of torque-measuring cassette holder 106 as would be seen at section line 1H of FIG. 1F, according to some embodiments of the present invention.

FIG. 1i is an end cross-section view of a torque-measuring cassette holder 106 that uses a plurality of multi-rib groups, each multi-rib group having a plurality of ribs, wherein each rib has a center plane that is offset from a rotational axis of holder 106, as would be seen at section line 1i of FIG. 1J or FIG. 1K, according to some embodiments of the present invention.

FIG. 1i1 is an end cross-section view of four alternative posts 142 for torque-measuring cassette holder 106, wherein each post has a flattened face that lies in a plane parallel to a plane that passes through the rotational axis.

FIG. 1J is a side cross-section view of torque-measuring cassette holder 106 as would be seen at section line 1J of FIG. 1i, according to some embodiments of the present invention.

FIG. 1K is a side cross-section view of torque-measuring cassette holder 106 as would be seen at section line 1K of FIG. 1i, according to some embodiments of the present invention.

FIG. 1L is an end cross-section view of a torque-measuring cassette holder 108 that uses a plurality of multi-rib groups, each multi-rib group having a plurality of ribs, wherein each rib has a center plane that is offset from a rotational axis of holder 108, as would be seen at section line 1L of FIG. 1M or FIG. 1N, according to some embodiments of the present invention.

FIG. 1M is a side cross-section view of torque-measuring cassette holder 108 as would be seen at section line 1M of FIG. 1L, according to some embodiments of the present invention.

FIG. 1N is a side cross-section view of torque-measuring cassette holder 108 as would be seen at section line 1N of FIG. 1L, according to some embodiments of the present invention.

FIG. 2A is a side cross-section view of a torque-measuring cassette holder 201 that uses a plurality of multi-rib groups, each multi-rib group having a plurality of ribs, wherein each rib has a center plane that is offset from a rotational axis of holder 201, as would be seen at section line 2A of FIG. 2B, according to some embodiments of the present invention.

FIG. 2C is an end cross-section view of torque-measuring cassette holder 201 as would be seen at section line 2C of FIG. 2A, according to some embodiments of the present invention.

FIG. 2D is an end cross-section view of torque-measuring cassette holder 201 as would be seen at section line 2D of FIG. 2A, according to some embodiments of the present invention.

FIG. 2E is an end cross-section view of torque-measuring cassette holder 201 as would be seen at section line 2E of FIG. 2A, according to some embodiments of the present invention.

FIG. 2F is an end cross-section view of torque-measuring cassette holder 201 as would be seen at section line 2F of FIG. 2A, according to some embodiments of the present invention.

FIG. 2i is a side cross-section view of a sprocket assembly 205 using a torque-measuring cassette holder 201 according to some embodiments of the present invention.

FIG. 2J is an end cross-section view of torque-measuring cassette holder 201 as would be seen at section line 2J of FIG. 2A, according to some embodiments of the present invention.

FIG. 2K is a front-top isometric view of torque-measuring cassette holder 201, according to some embodiments of the present invention.

FIG. 2L is a partial-cross-section isometric view of torque-measuring cassette holder 201, according to some embodiments of the present invention.

FIG. 2M is a reduced-size back view of torque-measuring cassette holder 201, according to some embodiments of the present invention.

FIG. 2N is a reduced-size front view of torque-measuring cassette holder 201, according to some embodiments of the present invention.

FIG. 2O is a reduced-size right-side view of torque-measuring cassette holder 201, according to some embodiments of the present invention.

FIG. 2P is a reduced-size top view of torque-measuring cassette holder 201, according to some embodiments of the present invention.

FIG. 2Q is a reduced-size bottom view of torque-measuring cassette holder 201, according to some embodiments of the present invention.

FIG. 3A is a side cross-section view of a torque-measuring cassette holder 301 that uses a plurality of multi-rib groups, each multi-rib group having a plurality of ribs, wherein each rib has a center plane that is offset from a rotational axis of holder 301, as would be seen at section line 3A of FIG. 3E, according to some embodiments of the present invention.

FIG. 3B is a backside isometric view of torque-measuring cassette holder 301, according to some embodiments of the present invention.

FIG. 3G is a partial-cross-section isometric view of torque-measuring cassette holder 301, according to some embodiments of the present invention.

FIG. 4A is a diagram of an apparatus 401 according to some embodiments of the present invention that uses a torque sensor mounted outside the sprocket assembly.

FIG. 4B is a diagram of an apparatus 402 according to some embodiments of the present invention that uses a torque sensor mounted inside the sprocket assembly.

FIG. 9C is a backside isometric view of torque-measuring cassette holder 901, according to some examples of the present invention.

FIG. 9D is a backside view of a back cover 904 for torque-measuring cassette holder 901 wherein inner radius 904A of back cover 904 forms a frictionless seal against sealing edge 903A of inner freehub member 903, according to some examples of the present invention. Similarly, back cover 904 may be interposed between sealing edge 903A and sealing edge 703 of inner spacer 702. Back cover 904 may be affixed via mounting holes 908 to mounting bosses 909 in cassette holder 901. Circuit 501 may be rigidly affixed to back cover 904 and/or cassette holder 901 via mounting holes 908 and mounting bosses 909 or via other mounting bosses rigidly attached to an outer tubular structure of cassette holder 901.

FIG. 9E is a front-top view of a front cover gasket ring 905 for torque-measuring cassette holder 901 wherein outer radius 905A of front cover ring 905 forms a frictionless seal against sealing edge 912 of outer freehub member 902. Front cover ring 905 may be rigidly affixed to sealing edge 703 of inner spacer 702 which may be rigidly connected to inner freehub member 903 via mounting holes 704, according to some examples of the present invention.

DESCRIPTION OF PREFERRED EMBODIMENTS

Figure 2H:
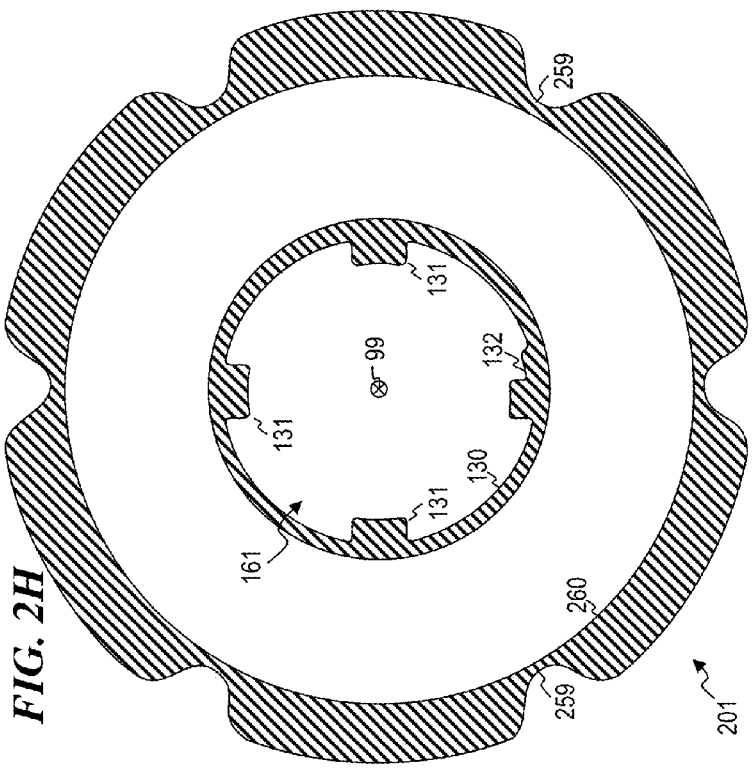
FIG. 2H is an end cross-section view of torque-measuring cassette holder 201 as would be seen at section line 2H of FIG. 2A, according to some embodiments of the present invention.

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

FIG. 1A is a side cross-section view of a torque-measuring cassette holder 101 that uses a plurality of single ribs each having a center plane that passes through a rotational axis of holder 101, as would be seen at section line 1A of FIG. 1B, according to some embodiments of the present invention. Referring also to FIG. 1B, each flexible rib 128 connects the outer tubular structure 110 to the inner tubular structure 130, and the plurality of flexible ribs 128 are the only structural members that connect outer tubular structure 110 to inner tubular structure 130. The plurality of flexible ribs 128 allow outer tubular structure 110 to rotate slightly relative to inner tubular structure 130, while keeping the outer tubular structure 110 concentric and centered relative to inner tubular structure 130 and the device's rotational axis 99. This allows a rotational-displacement-measurement device affixed relative to at least one of the tubular structures (110 or 130) to measure a torque applied between, for example, chain-driven sprockets attached to the outer tubular structure 110 and a hub having a plurality of slots that receive the plurality of splines 131 and 132 projecting inward from the inner tubular structure 130. In some embodiments, cassette holder 101 is milled from and/or cast as a single piece of a suitable metal (i.e., some embodiments start by casting the basic shape of cassette holder 101 using a suitable metal, and then milling operations are performed to achieve the final desired shape). In other embodiments, cassette holder 101 is milled and/or cast from a suitable polymer or composite material.

In some embodiments, the central bore 161 of cassette holder 101 fits onto and over a rear-wheel hub of a bicycle, with splines 131 and 132 fitting into slots in the hub.

In the embodiment of cassette holder 101 shown in FIG. 1A, FIG. 1B and FIG. 1C, each flexible rib 128 is a "radial rib" (as that term is used herein) characterized by a center plane 90 that is co-planar with a radial plane 98 that contains the rotational axis 99 of cassette holder 101 (i.e., rotational axis 99 of cassette holder 101 lies within each plane 98). In other words, the rotational axis 99 of cassette holder 101 lies within the center plane 90 of each rib 128. FIG. 1A is a cross-section view through the central plane 90 of the ribs 128 at the top and bottom of FIG. 1B.

FIG. 1B is an end cross-section view of torque-measuring cassette holder 101 as would be seen at section line 1B of FIG. 1A, according to some embodiments of the present invention. In some embodiments, spline 132 has a shape (i.e., it is "keyed") that is different than the other splines 131, in order to align it to have a predetermined orientation to the hub. In some embodiments, this keyed spline is not necessary for the function of the present invention, but is used in order that the torque-measuring cassette holder 101 can be used with legacy bicycle hubs of certain manufacturers. For each such legacy hub, various embodiments of the present invention are fabricated with the splines needed to interface with the given hub. In some embodiments, the outer surface of the outer tubular member 110 is also fabricated with slots, pins, or other holders and/or keys and/or indicia (e.g., see the examples set forth in FIG. 1i and FIG. 3C described below) that indicate the orientation at which the sprockets or sprocket cassettes/clusters are to be mounted to the outside of cassette holder 101. In some embodiments, the radial ribs 128 are arranged in groups of one or more ribs per group (one rib per group and four groups are shown in FIG. 1B; however, other embodiments include more than one rib per group, and three or six groups of ribs (or other suitable number of groups)). In some embodiments, each group of ribs 128 is separated from adjacent groups by a slot 111. In some embodiments, each slot 111 has a widened end opening at both ends that includes an inward slot extension 127 (which widens the radial dimension of the rib 128) that extends toward and/or into the back or outside portion of the spline 131 or 132, and the rib is located at its respective spline 131 or 132. Thus the torque (delivered through the rib 128) from the outer tubular member 110 is transferred to the inner tubular member 130 right at the spline 131 or 132, which then transfers the torque to the hub. By positioning the rib-widening inward slot extension 127 at the spline 131 or 132 where the inner tubular member has the most material available on its inward side, this allows the formation of a wider rib than might be possible were the slot extended inward at a location away from the spline. In some embodiments, the outer tubular member 110 includes an outward-projecting spline adjacent each flexible rib 128 to transfer torque from the sprockets (see FIG. 2i) to the ribs 128 and to allow an outward extension of the slot 111 opposite the inward extension 127 (such as indicated in FIG. 1D by extension 126).

FIG. 1C is a side cross-section view of torque-measuring cassette holder 101 as would be seen at section line 1C of FIG. 1B, according to some embodiments of the present invention. In this example cross section, the radial section plane at 1C of FIG. 1B is about 30 degrees clockwise from the vertical radial plane 98, and the upper and left-hand splines 131 of FIG. 1B are visible on the far side of through-hole center bore 161

FIG. 1D is an end cross-section view of a torque-measuring cassette holder 104 that uses a plurality of single ribs each having a center plane that is offset from a rotational axis of holder 104, according to some embodiments of the present invention. In contrast to the radial ribs 128 of FIG. 1B, the canted ribs 120 of FIG. 1D each have a center plane 90 that are offset at an angle from the radial plane 98 that extends from the center axis of rotation 99 toward the respective canted rib 120. This canting of the ribs 120 allows a greater amount of rotation (as compared to cassette holder 101 of FIG. 1B) of the outer tubular member 110 in a clockwise direction (from the perspective of FIG. 1D) relative to the inner tubular member 130 without stretching the wall or deforming the outer tubular member 110 inward or deforming the inner tubular member 130 outward. By forming the walls to have equal thicknesses and the same cant angle between their respective center planes 90 and radial planes 98, each canted rib 120 will bend by equal (or substantially equal) amounts, thus keeping outer tubular structure 110 concentric and centered relative to inner tubular structure 130 and to the device's rotational axis 99.

In some embodiments, the plurality of ribs 120 each have a rib-length dimension 93 in a length direction parallel to the rotational axis 99, a rib-width dimension 92 in a width direction perpendicular to the length direction and extending from a line at a shorter radial distance from the rotational axis and a line at a longer radial distance from the rotational axis, and a minimum rib-thickness dimension 91 in a thickness direction perpendicular to the length direction and perpendicular to the width direction, wherein the length dimension is greater than the width dimension and the width dimension is greater than the thickness dimension. In some embodiments, the minimum rib-thickness dimension 91 is less than 33% of the rib width dimension 92 (in some embodiments, the rib thickness dimension 91 is in a range of 12% to 25% of the rib width dimension 92; in some embodiments, the rib thickness dimension 91 is about 14% of the rib width dimension 92), and the rib thickness dimension 91 is less than 16% of the rib length dimension 93 (see FIG. 1A) (in some embodiments, the rib thickness dimension 91 is in a range of 3% to 10% of the rib length dimension 93; in some embodiments, the rib thickness dimension 91 is about 4% of the rib length dimension 93). In some embodiments, the walls of ribs 120 at their inner-diameter edge and their outer-diameter edge are rounded and slightly thicker than in the middle.

FIG. 1E is an end cross-section view of a torque-measuring cassette holder 105 that uses a plurality of ribs 129 each having a center plane that is offset from a rotational axis of holder 105 but which are thick enough that a plane that passes through a rotational axis lies within the entire width of the rib, as would be seen at section line 1B of FIG. 1A, according to some embodiments of the present invention. In some embodiments, the rib thickness dimension (see dimension 91 of FIG. 1D) is about 33% of the rib width dimension (see dimension 92 of FIG. 1D), and the rib thickness dimension 91 is less than 16% of the rib length dimension 93 (see FIG. 1A). In some embodiments, the walls of ribs 129 at their inner-diameter edge and their outer-diameter edge are rounded and slightly thicker than in the middle. The use of thicker splines 129 (as compared to the thickness of splines 120 of FIG. 1D) accommodates a greater amount of torque between the outer tubular member 110 and the inner tubular member 130.

FIG. 1F is an end cross-section view of a torque-measuring cassette holder 106 as would be seen at section line 1F of FIG. 1H, according to some embodiments of the present invention. In some embodiments, cassette holder 106 includes a plurality of multi-rib groups 122, each multi-rib group 122 having a plurality of canted ribs 121, wherein each rib 121 has a center plane 90 that is offset from a rotational axis 99 of cassette holder 106. In some embodiments, a plurality of ribs 121 extend outward from the center portion of each spline 131 or 132. In some embodiments, one or more ribs 121 extend outward from beyond the sides of each spline 131 or 132, but are still near the spline. The use of multiple canted ribs 121 in each multi-rib group 122 (as compared to the single spline 120 of FIG. 1D) accommodates a greater amount of torque between the outer tubular member 110 and the inner tubular member 130, as well as perhaps a greater amount of angular deflection than the thicker stiffer ribs 129 of FIG. 1E. Other aspects of FIG. 1F are as described above for like-numbered references. In some embodiments, section line 1H passes through each one of a pair of holes 123 (one at the top of the FIG. 1F and the other at the bottom). In some embodiments, a plurality 125 of holes 123 within each group of ribs 122 form one or more inner ribs (e.g., in the embodiment shown here, three holes 123 form four ribs 121 in each group 122).

FIG. 1G is a side cross-section view of torque-measuring cassette holder 106 as would be seen at section line 1G of FIG. 1F, according to some embodiments of the present invention. In some embodiments, although each rib is canted such that the axis of rotation 99 does not lie in the center plane 90 of each rib 121, a radial plane along section line 1G of FIG. 1F will lie completely inside at least some of the ribs 121, as shown in FIG. 1G.

FIG. 1H is a side cross-section view of torque-measuring cassette holder 106 as would be seen at section line 1H of FIG. 1F, according to some embodiments of the present invention. In some embodiments, section line 1H of FIG. 1F passes through each one of a pair of holes 123 (one at the top of the FIG. 1F and the other at the bottom), as shown by the openings labeled 123 in this FIG. 1H.

FIG. 1i is an end cross-section view of a torque-measuring cassette holder 106 that uses a plurality of multi-rib groups, each multi-rib group having a plurality of ribs, wherein each rib has a center plane that is offset from a rotational axis of holder 106, as would be seen at section line 1i of FIG. 1J or FIG. 1K, according to some embodiments of the present invention. In some embodiments, a plurality 125 of holes 123 within each group of ribs 122 form one or more inner ribs (e.g., in the embodiment shown here, four holes 123 form five ribs 121 in each group 122). In some embodiments, as shown here, each of the plurality of openings 111 is narrowed inward at or near its middle to provide space for one of the plurality of slots 114 and/or posts 140. In some embodiments, one or more sprockets or sprocket cassettes are mounted around the outside of outer tubular member 110, and when rotated, will apply their rotational torque force against the sides of the slots 114 and/or a face of one of the posts 140. In some embodiments, each post is cylindrical in shape (circular in cross section). In other embodiments, each post has a flattened face that lies in a plane that passes through the rotational axis.

FIG. 1i1 is an end cross-section view of four alternative posts 142 for torque-measuring cassette holder 106, wherein each post has a flattened face that lies in a plane that passes through the rotational axis.

FIG. 1J is a side cross-section view of torque-measuring cassette holder 106 as would be seen at section line 1J of FIG. 1i, according to some embodiments of the present invention.

FIG. 1K is a side cross-section view of torque-measuring cassette holder 106 as would be seen at section line 1K of FIG. 1i, according to some embodiments of the present invention.

FIG. 1L is an end cross-section view of a torque-measuring cassette holder 108 that uses a plurality of multi-rib groups 122, each multi-rib group having a plurality of ribs 121, wherein each rib has a center plane 90 that is offset from a rotational axis 99 of holder 108, as would be seen at section line 1L of FIG. 1M or FIG. 1N, according to some embodiments of the present invention. In some embodiments, a single elongated hole 123 forms two ribs 121 in each group of ribs 122, wherein each rib is canted at an angle such that its characteristic center plane 90 is at an angle to the radial plane that extends between rotational axis 99 and group of ribs 122. In some embodiments, at least some of the inward extensions 127 of each opening 111 extend so far inward into its corresponding spline 132 that there is no complete circle centered on rotational axis 99 that fits entirely inside the inner tubular member 130. In some embodiments, at least the majority, but not all, of the circumference of a circle centered on rotational axis 99 fits inside the inner tubular member 130. In some embodiments, at least 80%, but not all, of the circumference of a circle centered on rotational axis 99 fits inside the inner tubular member 130. Similarly, at least some of the inward deviations of outer tubular member 110 that form the outer slots or grooves 114 extend so far inward that there is no complete circle centered on rotational axis 99 that fits entirely inside the outer tubular member 110. In some embodiments, at least the majority, but not all, of the circumference of a circle centered on rotational axis 99 fits inside the outer tubular member 110. In some embodiments, at least 70%, but not all, of the circumference of a circle centered on rotational axis 99 fits inside the outer tubular member 110.

FIG. 1M is a side cross-section view of torque-measuring cassette holder 108 as would be seen at section line 1M of FIG. 1L, according to some embodiments of the present invention.

FIG. 1N is a side cross-section view of torque-measuring cassette holder 108 as would be seen at section line 1N of FIG. 1L, according to some embodiments of the present invention.

FIG. 2A is a side cross-section view of a torque-measuring cassette holder 201 that uses a plurality of multi-rib groups 122 (such as in FIG. 1F), each multi-rib group having a plurality of ribs 121, wherein each rib has a center plane that is offset from a rotational axis of holder 201, as would be seen at section line 2A of FIG. 2B, according to some embodiments of the present invention. In some embodiments, each canted rib 121 connects at its outer edge to a outer rib-support portion 210 of the cantilevered outer tubular structure 211, wherein the cantilevered outer tubular structure 211 includes a front stiffening wall 261 that stiffens the left end of outer rib-support portion 210, a middle stiffening wall 260 that stiffens the right-hand end of outer rib-support portion 210 and the left end of outer enclosure portion 215 (which, in some embodiments, is thick for the majority of its circumference, but thinned at a plurality of outer circumferential positions (here, it is thinned at just two outer positions, the top and the bottom (see FIG. 2B)), while in other embodiments, it is thinned at more locations, for example, at six locations spread at 60-degree intervals to include the four other outer bolt holes shown in FIG. 2B. In some embodiments, the outer bolt holes and/or thinned portions form a plurality of pockets 216 and/or flat faces 217 (see FIG. 2B) to which the inside sprocket cassettes can apply torque. In some embodiments, the donut-shaped space between the inside wall of outer enclosure portion 215 and the outer wall of 230 and from the back (left-hand) end of torque-measuring cassette holder 201 to the left or back of middle stiffening wall 260 provide an enclosure that can be sealed from dirt, grease and water using a back wall and back-wall Teflon slip ring or rubber 0-ring that allows rotational displacement between inner structure 230 and outer enclosure portion 215, and a front-wall Teflon slip ring or rubber 0-ring that allows rotational displacement between the right-hand end of inner structure 230 and front stiffening wall 261. In some embodiments, the enclosure between the inside wall of outer enclosure portion 215 and the outer wall of 230 is used to contain electronics for the torque-measuring electronics.

FIG. 2B is a backside isometric view of torque-measuring cassette holder 201, according to some embodiments of the present invention. The reference numbers on FIG. 2B refer to like-numbered structures described for FIG. 2A. Other aspects of FIG. 2B are as described above for like-numbered references in descriptions of FIG. 1D through FIG. 1N.

FIG. 2C is an end cross-section view of torque-measuring cassette holder 201 as would be seen at section line 2C of FIG. 2A, according to some embodiments of the present invention. In some embodiments, front stiffening wall 261 has a circular inner diameter 251, an outer perimeter 252 having a plurality of notches 253 that accommodate one or more clusters of sprockets (called sprocket cassettes) and/or one or more individual sprockets that have inward-projecting splines. In some embodiments, the inner perimeter of the sprocket cassettes have a shape that closely fits on outer perimeter 252 of cassette holder 201, and which are driven by a chain from the pedal sprocket of the bicycle to apply torque to the outer tubular structure 211 where they touch it.

FIG. 2D is an end cross-section view of torque-measuring cassette holder 201 as would be seen at section line 2D of FIG. 2A, according to some embodiments of the present invention. In some embodiments, a plurality of posts 256 (corresponding to posts 140 of FIG. 1i and FIG. 1L) are formed partially recessed into notches 253. In some embodiments, posts 256 have axial holes milled or drilled (e.g., in some embodiments, these holes (optionally tapped with threads) are used to hold bolts used to affix the sprocket cassettes to torque-measuring cassette holder 201). In some embodiments, the inner perimeter 254 is undercut using a circular-saw-shaped bit, leaving the front stiffening wall 261 completely detached from the ribs 121, but leaving a outer perimeter wall 255 to connect the front stiffening wall 261 to the outer rib-support portion 210.

FIG. 2E is an end cross-section view of torque-measuring cassette holder 201 as would be seen at section line 2E of FIG. 2A, according to some embodiments of the present invention. The description of FIG. 2E is set forth in the description of FIG. 1*i* and FIG. 2D above, with like-numbered reference numbers referring to the same or similar structures in those figures.

FIG. 2F is an end cross-section view of torque-measuring cassette holder 201 as would be seen at section line 2F of FIG. 2A (i.e., through the middle stiffening wall 260), according to some embodiments of the present invention.

Figure 2G:
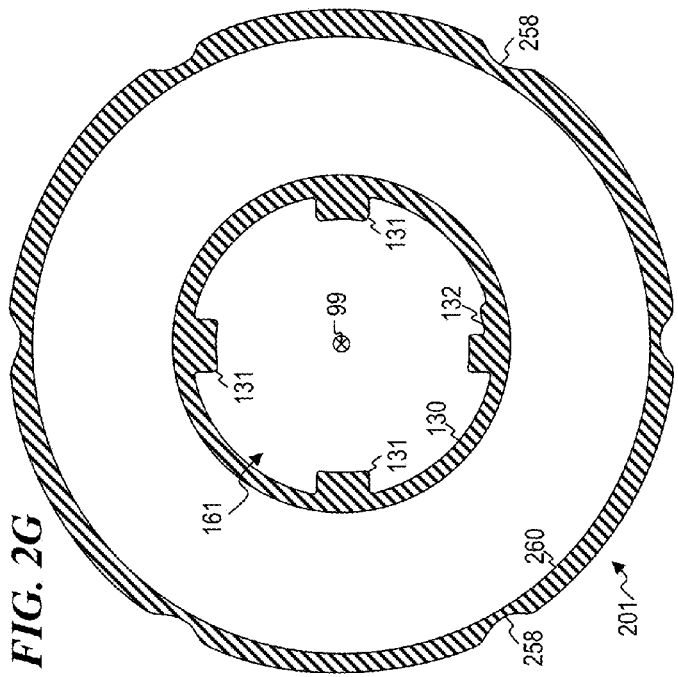
FIG. 2G is an end cross-section view of torque-measuring cassette holder 201 as would be seen at section line 2G of FIG. 2A, according to some embodiments of the present invention.

FIG. 2G is an end cross-section view of torque-measuring cassette holder 201 as would be seen at section line 2G of FIG. 2A, according to some embodiments of the present invention. In some embodiments, a plurality of notches 258 provide the support for large-diameter sprocket cassettes mounted to the front side of cassette holder 201 (the left-hand side of FIG. 2A)

FIG. 2H is an end cross-section view of torque-measuring cassette holder 201 as would be seen at section line 2H of FIG. 2A, according to some embodiments of the present invention. In some embodiments, a plurality of notches 259 provide the support for large-diameter sprocket cassettes mounted to the back side of cassette holder 201 (the right-hand side of FIG. 2A)

FIG. 2*i* is a side cross-section view of a sprocket assembly 205 using a torque-measuring cassette holder 201 (but also showing a plurality of sprocket cassettes 291-294), according to some embodiments of the present invention. In some embodiments, a small-diameter sprocket cassette 291 is attached to the front (left-hand) end of cassette holder 201 (e.g., in some embodiments, using bolts or right-ward facing projections that interface with cassette holder 201 at its left-hand face. In some embodiments, a medium-small-diameter sprocket cassette 292 is attached around the outer rib-support portion 210 of the cantilevered outer tubular structure 211 of cassette holder 201 (e.g., in some embodiments, using inward-facing tabs, splines or other projections that interface with cassette holder 201 around outer rib-support portion 210. In some embodiments, a medium-large-diameter sprocket cassette 293 is attached around the left end of outer enclosure portion 215 of the cantilevered outer tubular structure 211 of cassette holder 201 (e.g., in some embodiments, using inward-facing tabs, splines or other projections that interface with cassette holder 201 around left end of outer enclosure portion 215. In some embodiments, a large-diameter sprocket cassette 294 is attached around the right-hand end of outer enclosure portion 215 of the cantilevered outer tubular structure 211 of cassette holder 201 (e.g., in some embodiments, using inward-facing tabs, splines or other projections that interface with cassette holder 201 around right-hand end of outer enclosure portion 215. The splines 231 are press-fit or slid snugly over the grooves in hub 80. Torque applied via sprocket cassettes 291-294 is applied to the cantilevered outer tubular structure 211, and ribs 121 allow a rotational displacement between the cantilevered outer tubular structure 211 relative to the inner tubular structure 230

FIG. 2J is an end cross-section view of torque-measuring cassette holder 201 as would be seen at section line 2J of FIG. 2A, according to some embodiments of the present invention. The inner diameter surface 271 of the outer structure 211 and the outer diameter surface 272 of the inner structure 130 define a space in which the rotational-displacement sensor and electronics are placed in some embodiments. In some embodiments, the posts 218 and/or recesses 219 are structures to which the portion of the sensor attached to the outer structure 211 are attached. In some embodiments, one or more recesses or other structures of inner structure 130 are structures to which the portion of the sensor attached to the inner structure 130 are attached.

FIG. 2K is a front-top isometric view of torque-measuring cassette holder 201, according to some embodiments of the present invention.

FIG. 2L is a partial-cross-section isometric view of torque-measuring cassette holder 201, according to some embodiments of the present invention.

FIG. 2M is a reduced-size back view of torque-measuring cassette holder 201, according to some embodiments of the present invention.

FIG. 2N is a reduced-size front view of torque-measuring cassette holder 201, according to some embodiments of the present invention.

FIG. 2O is a reduced-size right-side view of torque-measuring cassette holder 201, according to some embodiments of the present invention.

FIG. 2P is a reduced-size top view of torque-measuring cassette holder 201, according to some embodiments of the present invention.

FIG. 2Q is a reduced-size bottom view of torque-measuring cassette holder 201, according to some embodiments of the present invention.

Figure 3C:
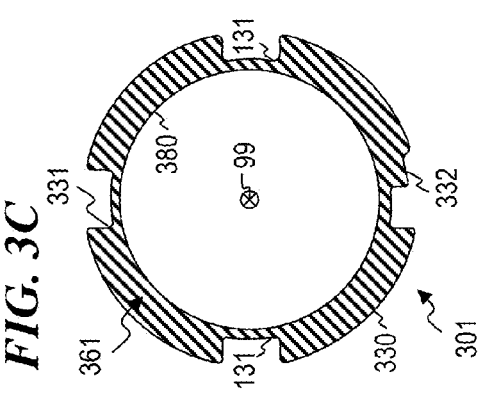
FIG. 3C is an end cross-section view of torque-measuring cassette holder 301 as would be seen at section line 3C of FIG. 3A, according to some embodiments of the present invention.
Figure 3D:
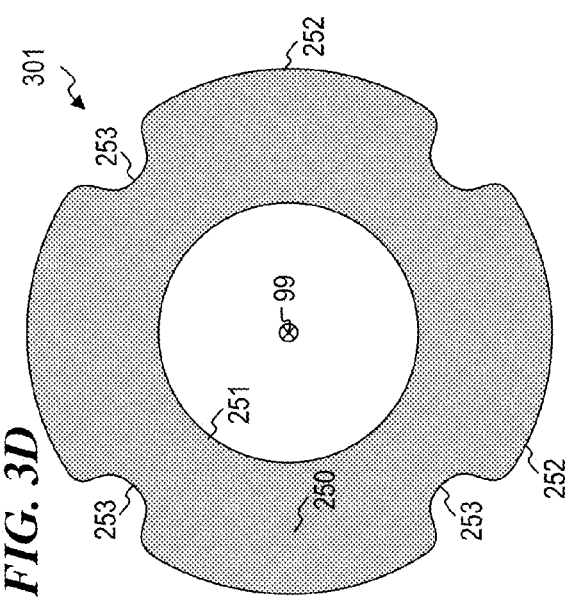
FIG. 3D is an end cross-section view of torque-measuring cassette holder 301 as would be seen at section line 3D of FIG. 3A, according to some embodiments of the present invention.
Figure 3E:
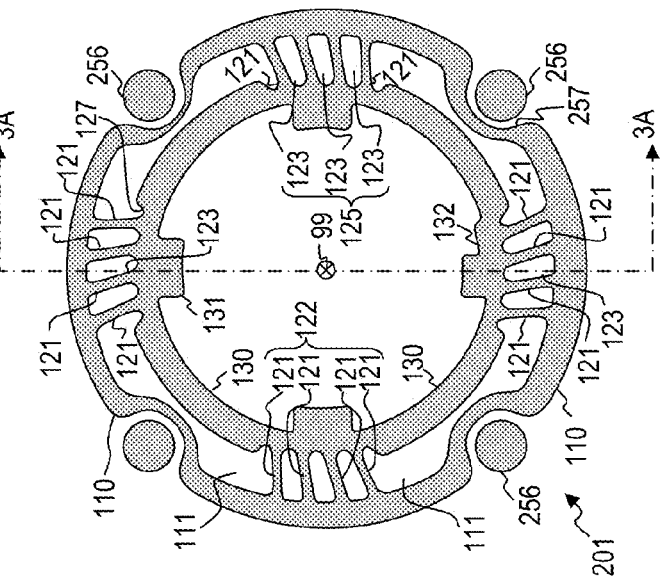
FIG. 3E is an end cross-section view of torque-measuring cassette holder 301 as would be seen at section line 3E of FIG. 3A, according to some embodiments of the present invention.

FIG. 3A is a side cross-section view of a torque-measuring cassette holder 301 that uses a plurality of multi-rib groups, each multi-rib group having a plurality of ribs, wherein each rib has a center plane that is offset from a rotational axis of holder 301, as would be seen at section line 3A of FIG. 3E, according to some embodiments of the present invention.

FIG. 3B is a backside isometric view of torque-measuring cassette holder 301, according to some embodiments of the present invention.

FIG. 3C is an end cross-section view of torque-measuring cassette holder 301 as would be seen at section line 3C of FIG. 3A, according to some embodiments of the present invention.

FIG. 3D is an end cross-section view of torque-measuring cassette holder 301 as would be seen at section line 3D of FIG. 3A, according to some embodiments of the present invention.

FIG. 3E is an end cross-section view of torque-measuring cassette holder 301 as would be seen at section line 3E of FIG. 3A, according to some embodiments of the present invention.

Figure 3H:
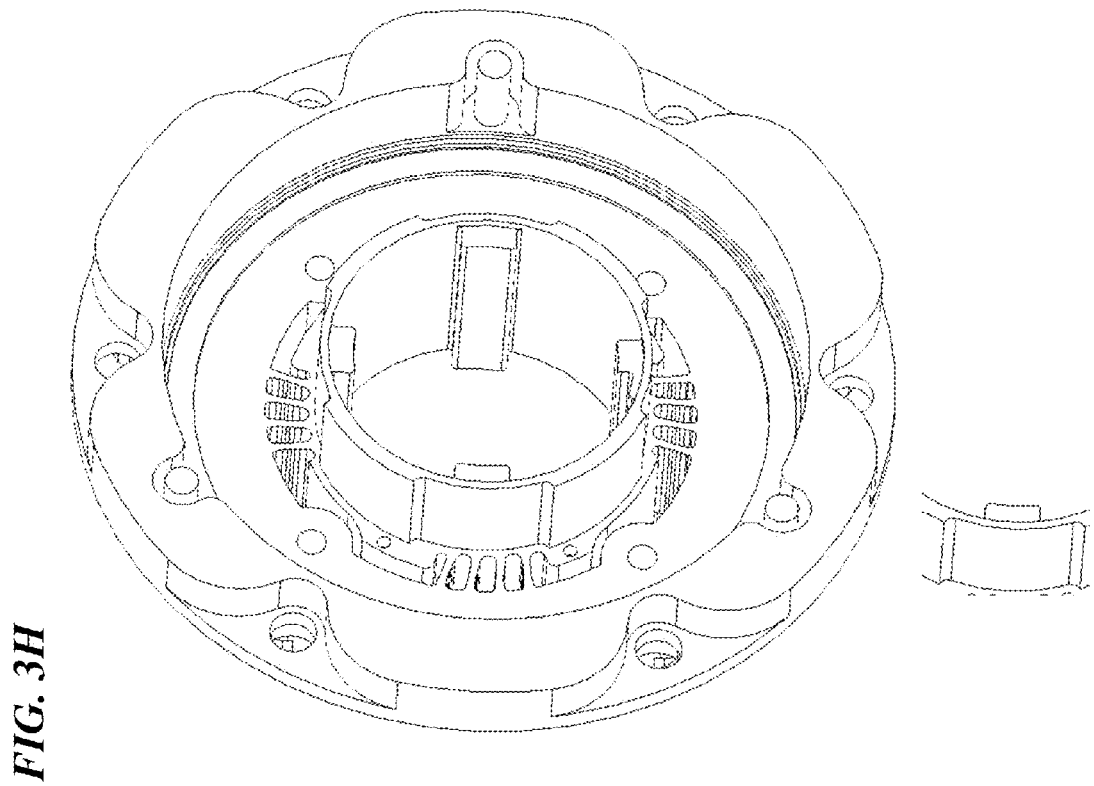
FIG. 3H is a backside isometric view of torque-measuring cassette holder 301, according to some embodiments of the present invention.
Figure 3F:
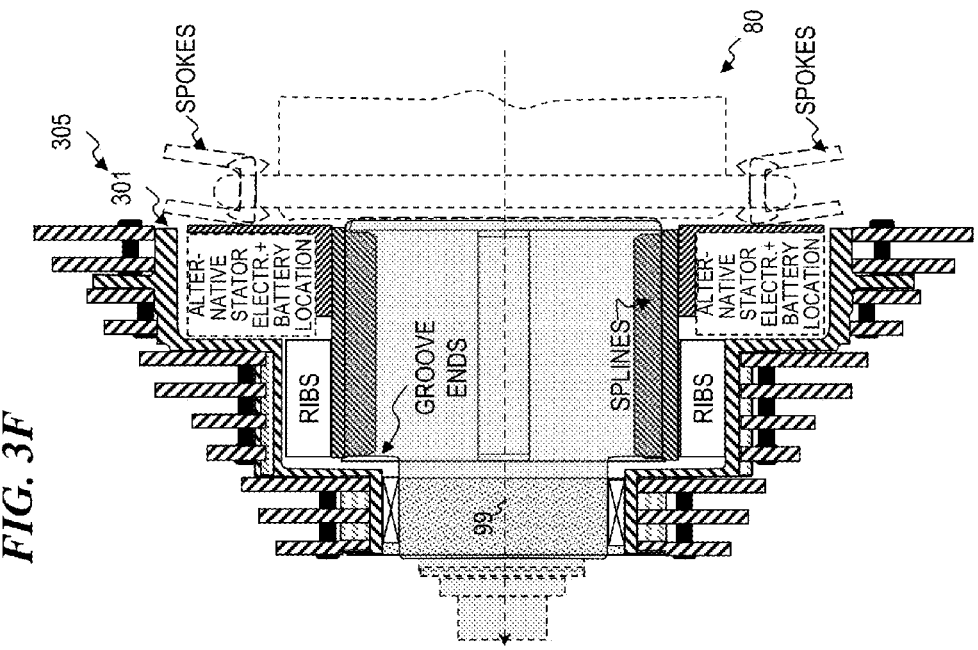
FIG. 3F is a side cross-section view of a sprocket assembly 305 using a torque-measuring cassette holder 301 according to some embodiments of the present invention.

FIG. 3F is a side cross-section view of a sprocket assembly 305 using a torque-measuring cassette holder 301, according to some embodiments of the present invention.

FIG. 3G is a partial-cross-section isometric view of torque-measuring cassette holder 301, according to some embodiments of the present invention.

FIG. 3H is a backside isometric view of torque-measuring cassette holder 301, according to some embodiments of the present invention.

FIG. 4A is a diagram of an apparatus 401 of some embodiments of the present invention that uses a torque sensor mounted outside the sprocket assembly. In some embodiments, apparatus 401 includes "stator" and "rotor" portions 410, wherein the "stator" portion is outside-of-sprocket on the freehub location of sensor, electronics, and wireless transmitter of some embodiments, and attached to the hub part, and wherein the "rotor" portion of the torque-measurement apparatus is affixed to the outer part.

FIG. 4B is a diagram of and apparatus 402 of some embodiments of the present invention that uses a torque sensor mounted inside the sprocket assembly. In some embodiments, apparatus 402 includes "stator" and "rotor" portions 420, wherein the "stator" portion is outside-of-sprocket on the freehub location of battery, sensor, electronics, and wireless transmitter of some embodiments, and attached to the hub part, and wherein the "rotor" portion of the torque-measurement apparatus is affixed to outer part.

Figure 5:
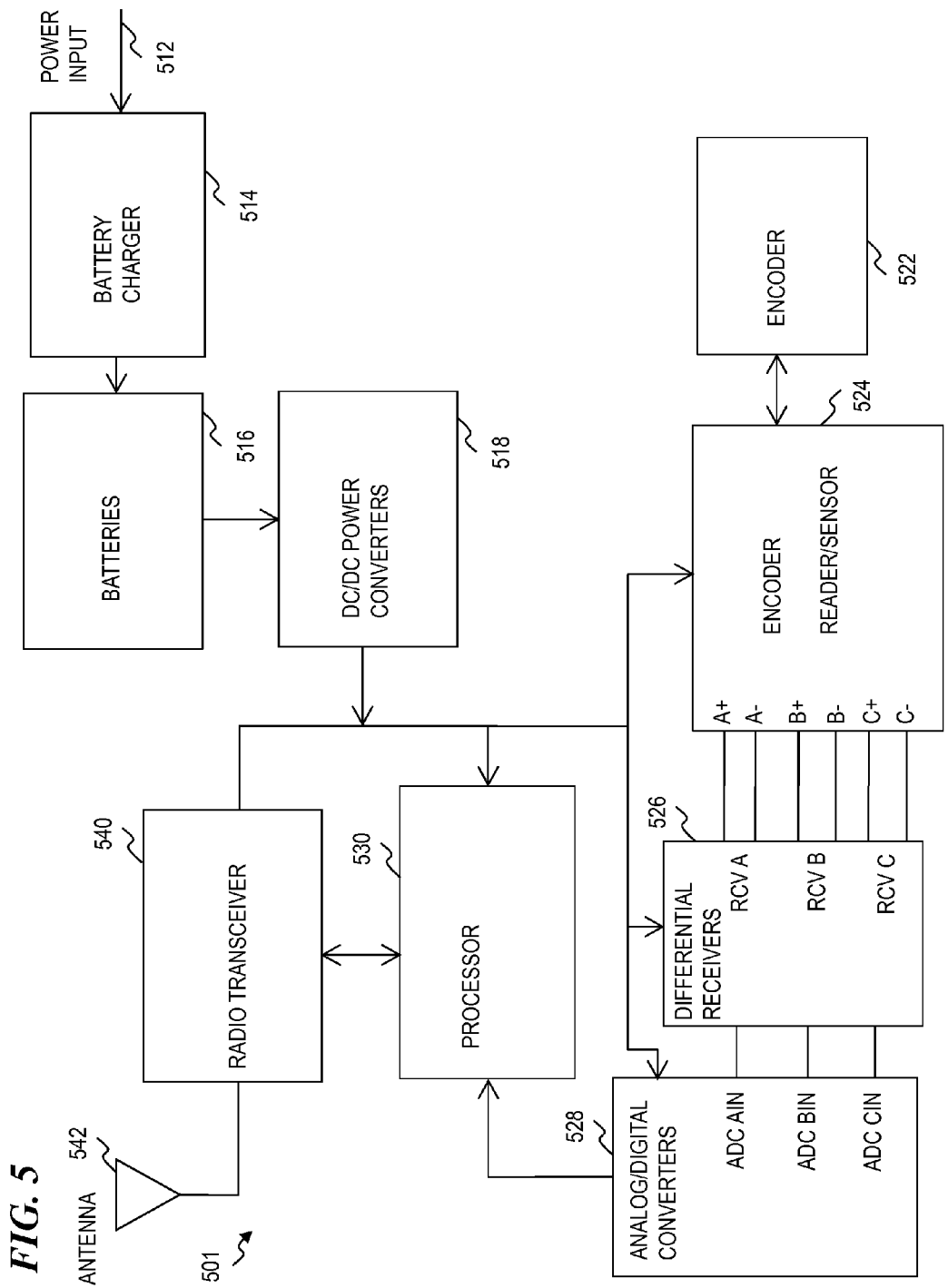
FIG. 5 is a diagram of an electrical circuit which may be located in torque-measuring cassette holder 301, according to some embodiments of the present invention.

FIG. 5 is a diagram of electrical circuit 501 which may be located inside or outside of torque-measuring cassette holders 101, 201, 301, 401, 701, and 901 according to some embodiments of the present invention. In some examples, cassette holders 101, 201, 301, 401, 701, and 901 include an electrical, optical, mechanical, and/or magnetic displacement-measuring device together with circuit 501 used as a torque-measuring sensor. Circuit 501 may receive an electrical, optical, mechanical, and or magnetic signal from encoder 522.

In some embodiments, circuit 501 includes an encoder 522, encoder-reader/sensor 524 coupled to receive data from the encoder 522, differential receivers 526 coupled to receive data from the encoder reader/sensor 524, A/D converters 528 coupled to receive differential signals from receivers 526, and processor 530 coupled to receive digital values based on the sensed data from ADCs 528. In some embodiments, power input 512 is delivered to charger 514 connected to batteries 516 that drive DC-DC converters 518, which power the rest of the electrical circuit 501. In some embodiments, processor 530 sends data to and receives commands from a remote computer via antenna 542 and radio transceiver 540. In some embodiments, the remote computer includes a display that in some embodiments, is mounted to a handlebar of the bicycle.

In some embodiments, the displacement-measuring device produces a signal proportional to torque applied by a bicycle rider to a sprocket of the sprocket-cassette holder via a chain by measuring the relative angular displacement of an outer portion of the holder in relation to an inner portion of the holder.

In some examples, the displacement-measuring device and circuit are powered by a direct-current (DC) power source, such as one or more batteries, that are located in a cavity inside the sprocket-cassette holder. In some examples, the displacement-measuring device and circuit are located in a cavity inside the sprocket-cassette holder. The outer portion of the sprocket-cassette holder may define the outer freehub member and the inner portion of the holder may define the inner freehub member. In some examples, the batteries, the displacement-measuring device, and the circuit may be located between the outer freehub member and the inner freehub member defined by the sprocket-cassette holder.

In some examples, the signal is wirelessly transmitted to a receiver unit coupled to a display. In some such examples, the display is mounted to the bicycle, while in other examples, the display is strapped to the wrist of the bicycle rider. In some examples, the display shows a numerical value for one or more parameters (such as torque, power, or energy) determined by the measured torque. In some examples, the display shows a graphical representation of the one or more parameters (such as torque, power, or energy) determined by the measured torque. In some examples, the graphical representation includes a graph of one or more of the parameters as a function of time for a trip. In some examples, the graphical representation of parameters of a current trip is displayed concurrently with graphical representation(s) of parameters of one or more past trips.

In some examples, the displacement-measuring device and circuit uses an electrical measurement between parallel plates with a plate affixed to an outer portion of the holder and another plate affixed to an inner portion of the holder. In some examples, the displacement-measuring device and circuit uses an optical measurement between a structure affixed to the outer portion of the holder and a structure affixed to the inner portion of the holder.

Figure 6B:
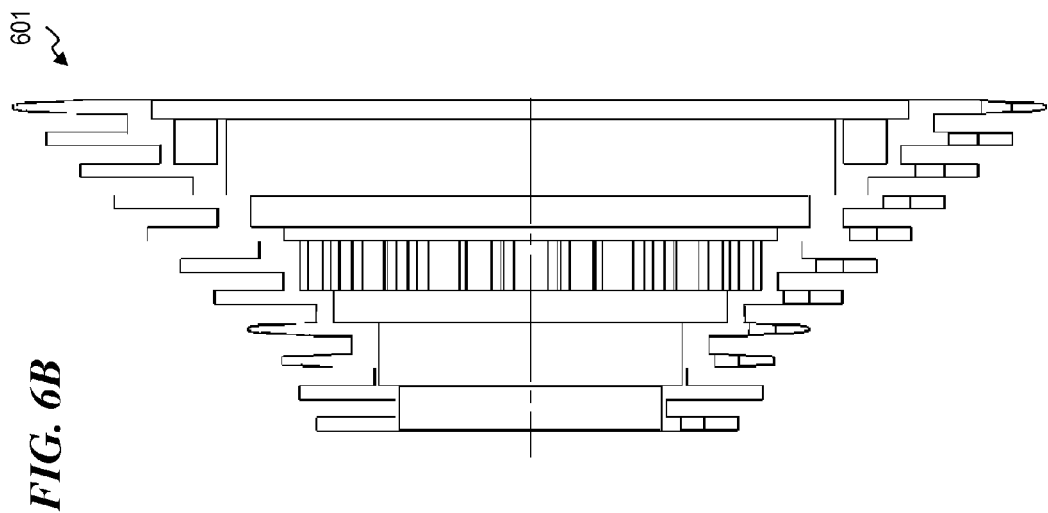
FIG. 6B is a side cross-section view of single-piece sprocket cassette assembly 601, according to some embodiments of the present invention.
Figure 6A:
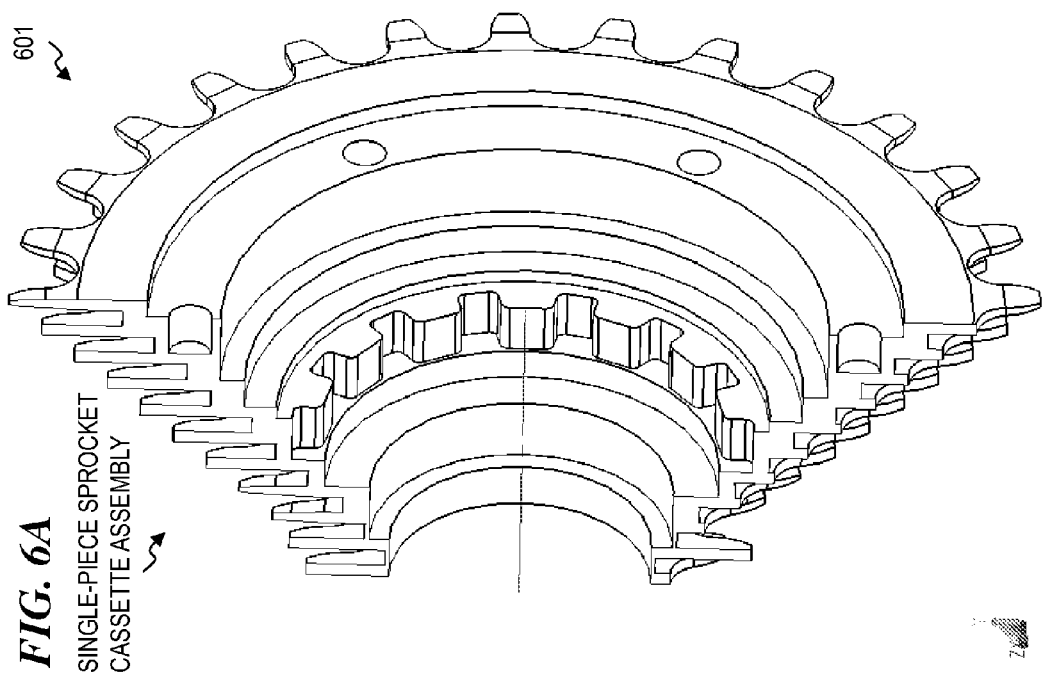
FIG. 6A is partial-cross-section isometric view of a single-piece sprocket cassette assembly 601 of a group of sprockets which may be affixed to the outer freehub member of a torque-measuring cassette holder, according to some embodiments of the present invention.

FIG. 6A is partial-cross-section isometric view of a single-piece sprocket cassette assembly 601 of a group of sprockets which may be affixed to the outer freehub member of a torque-measuring cassette holder, according to some embodiments of the present invention.

FIG. 6B is a side cross-section view of single-piece sprocket cassette assembly 601, according to some embodiments of the present invention.

Figure 7C:
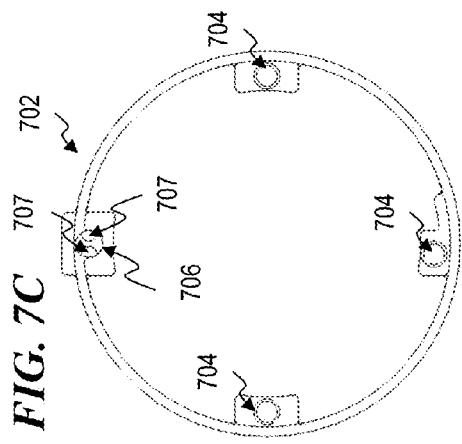
FIG. 7C is a front view of spacer 702 containing a power port for torque-measuring cassette holder 701, according to some examples of the present invention. A mini-jack receptacle may receive a mini-jack via power porthole 706 of inner spacer 702. Inner spacer 702 may contain backward-facing holes 707 to distribute power signals of power input 512 from a mini-jack receptacle within inner volume 705 to battery charger 514 of circuit 501.
Figure 7D:
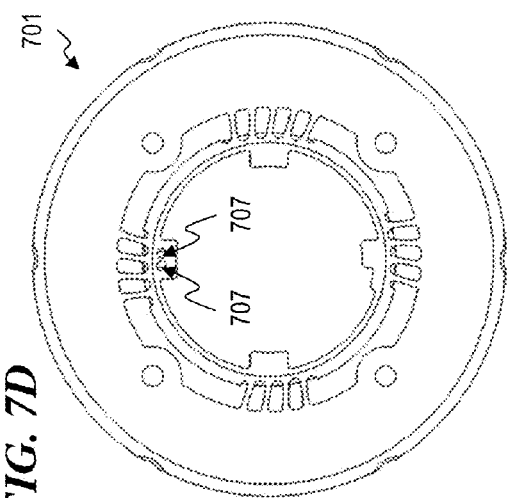
FIG. 7D is a reduced-size radially-cropped backside view of torque-measuring cassette holder 701, according to some examples of the present invention. Cassette holder 701 may receive power via wires running through backward-facing holes 707 from power signals of power input 512 from a mini-jack within inner volume 705 and distribute the power signals to battery charger 514 of circuit 501.
Figure 7B:
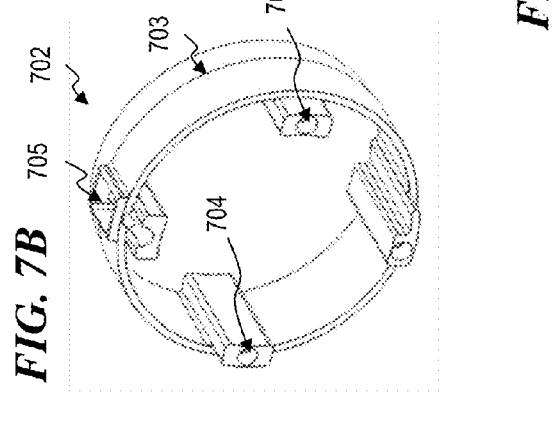
FIG. 7B is a front-top isometric view of inner spacer 702 containing a power port for torque-measuring cassette holder 701, according to some examples of the present invention. A mini-jack receptacle may be located within inner volume 705 of inner spacer 702 and then potted to seal the mini-jack from contaminant intrusion such as water.
Figure 7A:
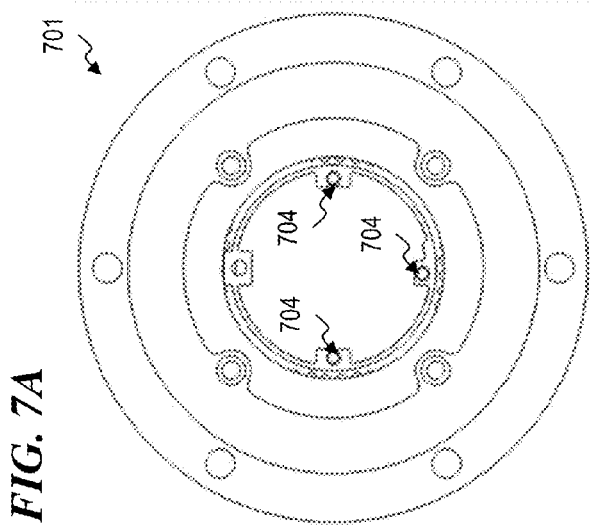
FIG. 7A is a reduced-size front view of a torque-measuring cassette holder 701, according to some embodiments of the present invention.

FIG. 7A is a reduced-size front view of a torque-measuring cassette holder 701, according to some embodiments of the present invention. In some embodiments, the splines of inside spacer 702 may be retained by a cassette-holding ring threaded into the end of the freehub to retain the torque-measuring cassette holder 701. The splines of inside spacer 702 that are retained by the cassette holder ring press the splines of cassette holder 701 forcibly against the freehub to retain the cassette holder on the freehub.

FIG. 7B is a front-top isometric view of inner spacer 702 containing a power port for torque-measuring cassette holder 701, according to some examples of the present invention. A mini-jack receptacle may be located within inner volume 705 of inner spacer 702 and then potted to seal the mini-jack from contaminant intrusion such as water.

FIG. 7C is a front view of spacer 702 containing a power port for torque-measuring cassette holder 701, according to some examples of the present invention. A mini-jack receptacle may receive a mini-jack via power porthole 706 of inner spacer 702. Inner spacer 702 may contain backward-facing holes 707 to distribute power signals of power input 512 from a mini-jack receptacle within inner volume 705 to battery charger 514 of circuit 501.

FIG. 7D is a reduced-size radially-cropped backside view of torque-measuring cassette holder 701, according to some examples of the present invention. Cassette holder 701 may receive power via wires running through backward-facing holes 707 from power signals of power input 512 from a mini-jack within inner volume 705 and distribute the power signals to battery charger 514 of circuit 501.

Figure 8B:
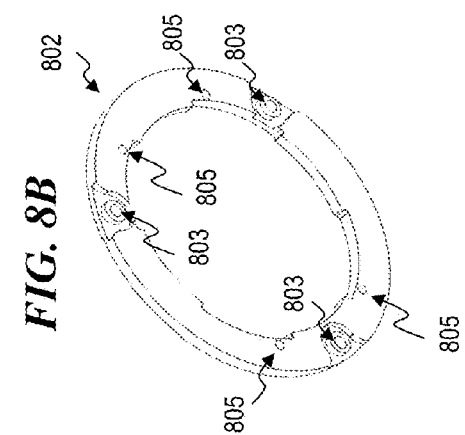
FIG. 8B is a front-top isometric view of an encoder holder 802 which may be used with encoder 801 or another encoder and an encoder sensor of a displacement-measuring device and circuit used as a torque-measuring sensor, according to some embodiments of the present invention.
Figure 8A:
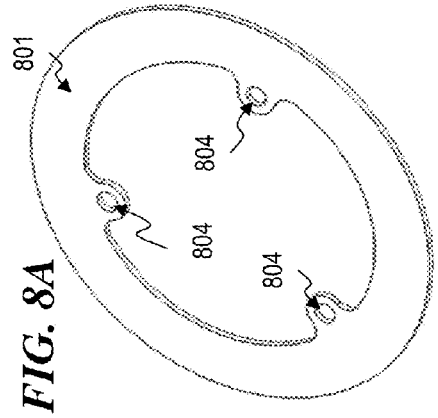
FIG. 8A is a front-top isometric view of an encoder 801 which may be used with an encoder sensor of a displacement-measuring device and circuit used as a torque-measuring sensor, according to some embodiments of the present invention. Encoder 801 may be rigidly affixed via mounting holes 804 to mounting holes 803 of encoder holder 802.

FIG. 8A is a front-top isometric view of an encoder 801 which may be used with an encoder sensor of a displacement-measuring device and circuit used as a torque-measuring sensor, according to some embodiments of the present invention.

FIG. 8A is a front-top isometric view of an encoder 801 which may be used with an encoder sensor of a displacement-measuring device and circuit used as a torque-measuring sensor, according to some embodiments of the present invention. Encoder 801 may be rigidly affixed via mounting holes 804 to mounting holes 803 of encoder holder 802

FIG. 8B is a front-top isometric view of an encoder holder 802 which may be used with encoder 801 or another encoder and an encoder sensor of a displacement-measuring device and circuit used as a torque-measuring sensor, according to some examples of the present invention. Encoder holder 802 may be rigidly affixed via mounting holes 805 to mounting holes 806 of torque-measuring cassette holder 901.

Figure 9B:
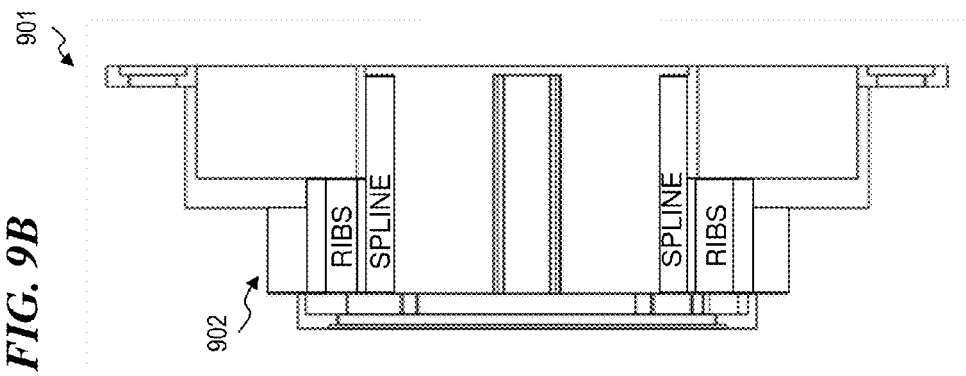
FIG. 9B is a side cross-section view of a torque-measuring cassette holder 901 with outer freehub member 902 that uses a plurality of multi-rib groups, each multi-rib group having a plurality of ribs, wherein each rib has a center plane that is offset from a rotational axis of holder 901, as would be seen similarly at section line 3A of FIG 3E, according to some examples of the present invention.
Figure 9A:
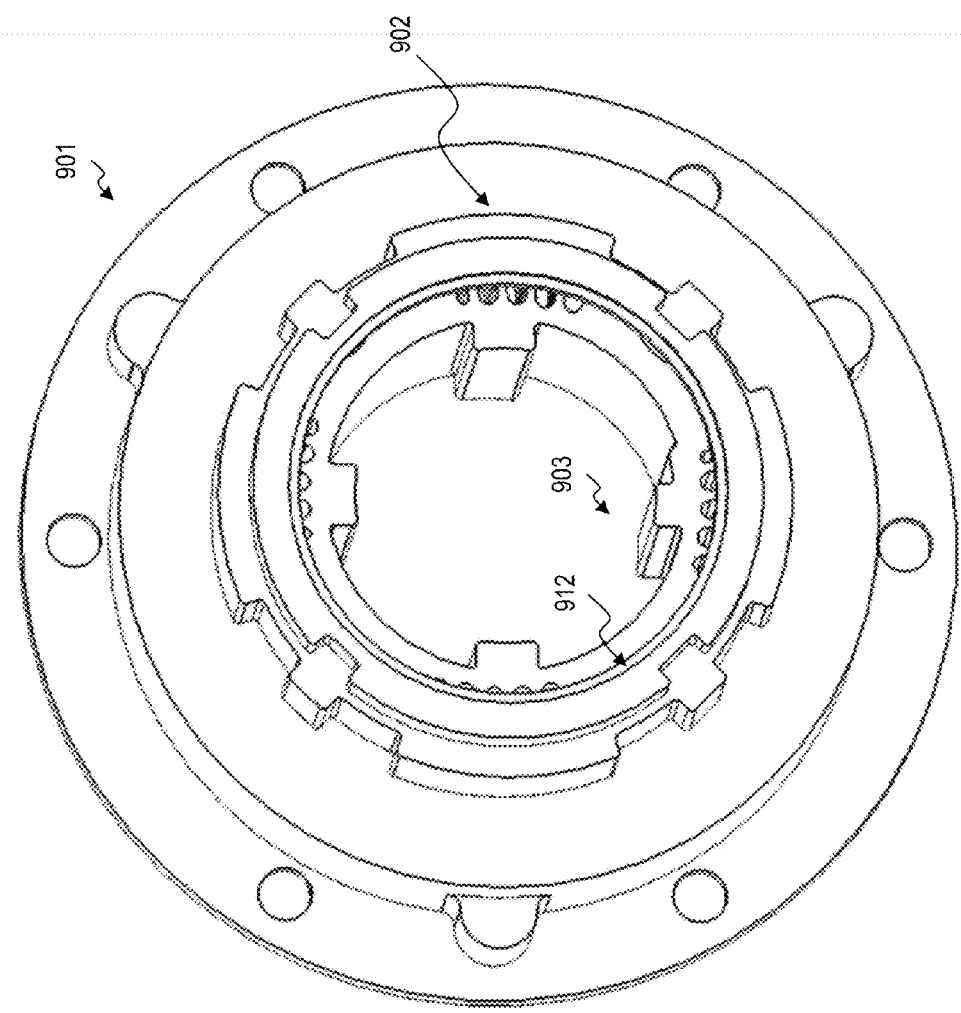
FIG. 9A is front-top isometric view of torque-measuring cassette holder 901 wherein the outer portion of cassette holder 901 may define an outer freehub member 902 and the inner portion of the holder may define an inner freehub member 903, according to some examples of the present invention.

FIG. 9A is front-top isometric view of torque-measuring cassette holder 901 wherein the outer portion of cassette holder 901 may define an outer freehub member 902 and the inner portion of the holder may define an inner freehub member 903, according to some examples of the present invention.

FIG. 9B is a side cross-section view of a torque-measuring cassette holder 901 with outer freehub member 902 that uses a plurality of multi-rib groups, each multi-rib group having a plurality of ribs, wherein each rib has a center plane that is offset from a rotational axis of holder 901, as would be seen similarly at section line 3A of FIG. 3E, according to some examples of the present invention.

FIG. 9C is a backside isometric view of torque-measuring cassette holder 901, according to some examples of the present invention.

FIG. 9D is a backside view of a back cover 904 for torque-measuring cassette holder 901 wherein inner radius 904A of back cover 904 forms a frictionless seal against sealing edge 903A of inner freehub member 903, according to some examples of the present invention. Similarly, back cover 904 may be interposed between sealing edge 903A and sealing edge 703 of inner spacer 702. Back cover 904 may be affixed via mounting holes 908 to mounting bosses 909 in cassette holder 901. Circuit 501 may be rigidly affixed to back cover 904 and/or cassette holder 901 via mounting holes 908 and mounting bosses 909 or via other mounting bosses rigidly attached to an outer tubular structure of cassette holder 901.

FIG. 9E is a front-top view of a front cover gasket ring 905 for torque-measuring cassette holder 901 wherein outer radius 905A of front cover ring 905 forms a frictionless seal against sealing edge 912 of outer freehub member 902. Front cover ring 905 may be rigidly affixed to sealing edge 703 of inner spacer 702 which may be rigidly connected to inner freehub member 903 via mounting holes 704, according to some examples of the present invention.

Figure 9G:
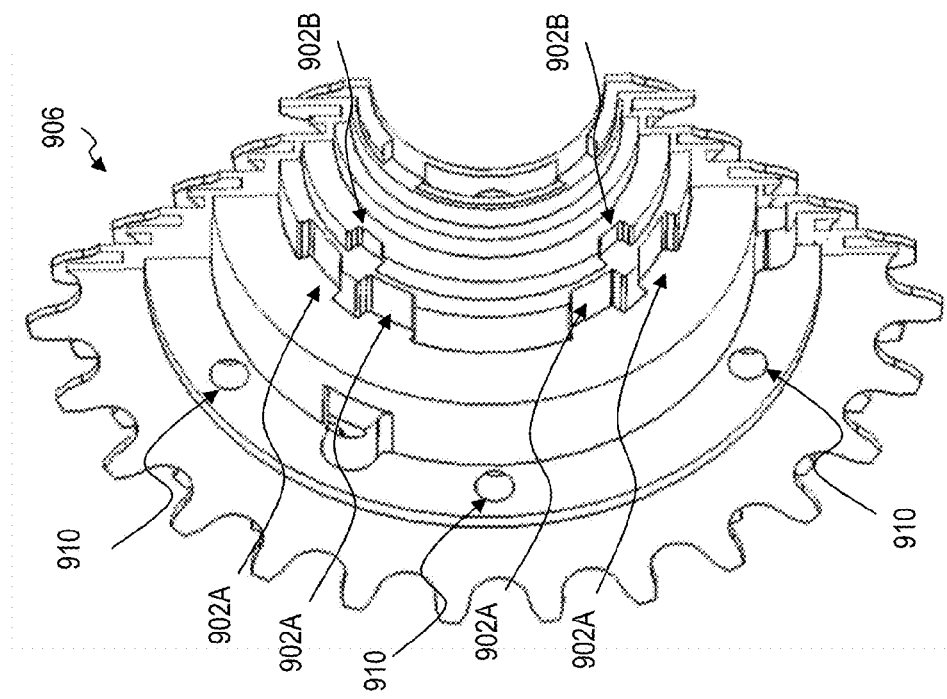
FIG. 9G is a side cross-section view of single-piece sprocket cassette assembly 906, according to some examples of the present invention. Single-piece sprocket cassette 906 may be rigidly affixed to mounting bosses 910 of the outer freehub member of cassette holder 901 via mounting holes 907. Single-piece sprocket-cassette 906 may be concentrically aligned to the outer freehub member of cassette holder 901 via splines 902A and 902B and other features of the interior surface of sprocket cassette 906 which identically match alignment features of the outer freehub member 902 of cassette holder 901.
Figure 9F:
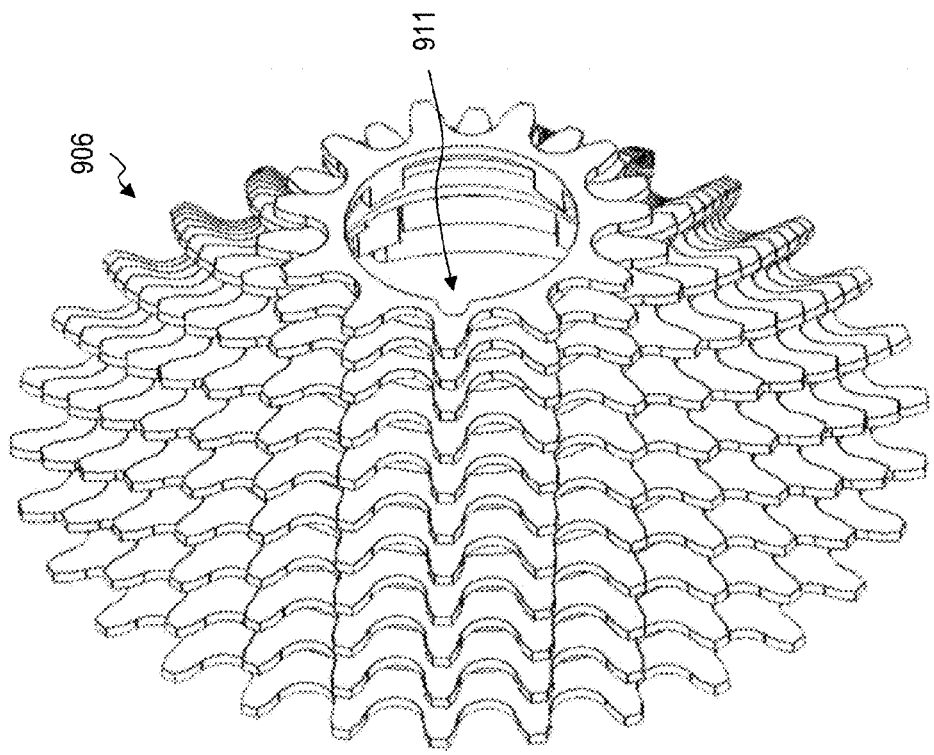
FIG. 9F is a front-top isometric view of a single-piece sprocket cassette assembly 906 of a group of sprockets which may be affixed to the outer freehub member of a torque-measuring cassette holder 901, according to some examples of the present invention. A power-port notch 911 may allow the insertion of a mini-jack power plug into mini-jack receptacle of inner spacer 702 via power porthole 706.

FIG. 9F is a front-top isometric view of a single-piece sprocket cassette assembly 906 of a group of sprockets which may be affixed to the outer freehub member of a torque-measuring cassette holder 901, according to some examples of the present invention. A power-port notch 911 may allow the insertion of a mini-jack power plug into mini-jack receptacle of inner spacer 702 via power porthole 706.

FIG. 9G is a side cross-section view of single-piece sprocket cassette assembly 906, according to some examples of the present invention. Single-piece sprocket cassette 906 may be rigidly affixed to mounting bosses 910 of the outer freehub member of cassette holder 901 via mounting holes 907. Single-piece sprocket-cassette 906 may be concentrically aligned to the outer freehub member of cassette holder 901 via splines 902A and 902B and other features of the interior surface of sprocket cassette 906 which identically match alignment features of the outer freehub member 902 of cassette holder 901.

Figure 9I:
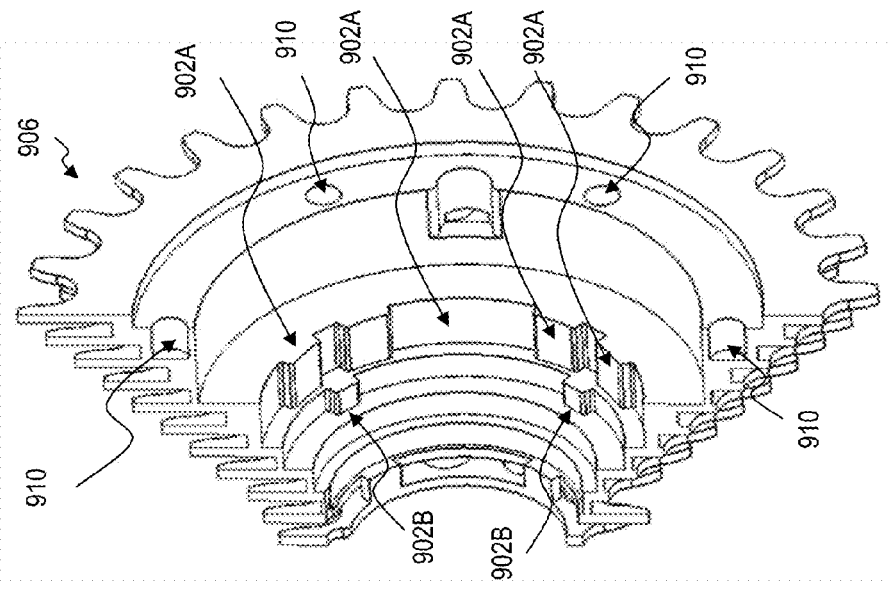
FIG. 9H and FIG. 9i show additional isometric views of the interior surface of single-piece sprocket cassette 906 which contains alignment features such as splines 902A and 902B which may concentrically align single-piece sprocket cassette 906 to alignment features on the outer freehub member 902 of cassette holder 901.
Figure 9H:
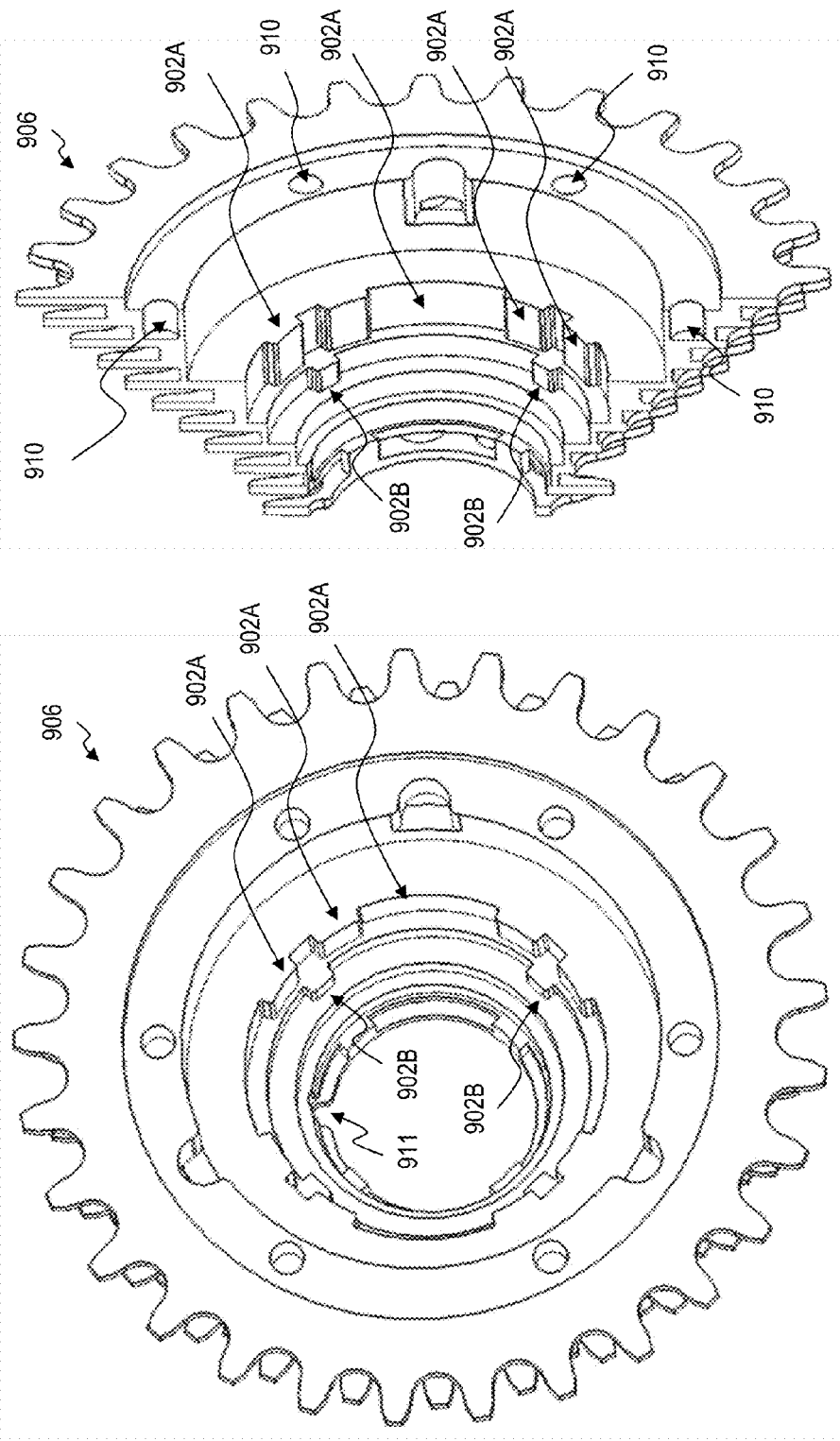

FIG. 9H and 9*i* show additional isometric views of the interior surface of single-piece sprocket cassette 906 which contains alignment features such as splines 902A and 902B which may concentrically align single-piece sprocket cassette 906 to alignment features on the outer freehub member 902 of cassette holder 901.

Figure 9J:
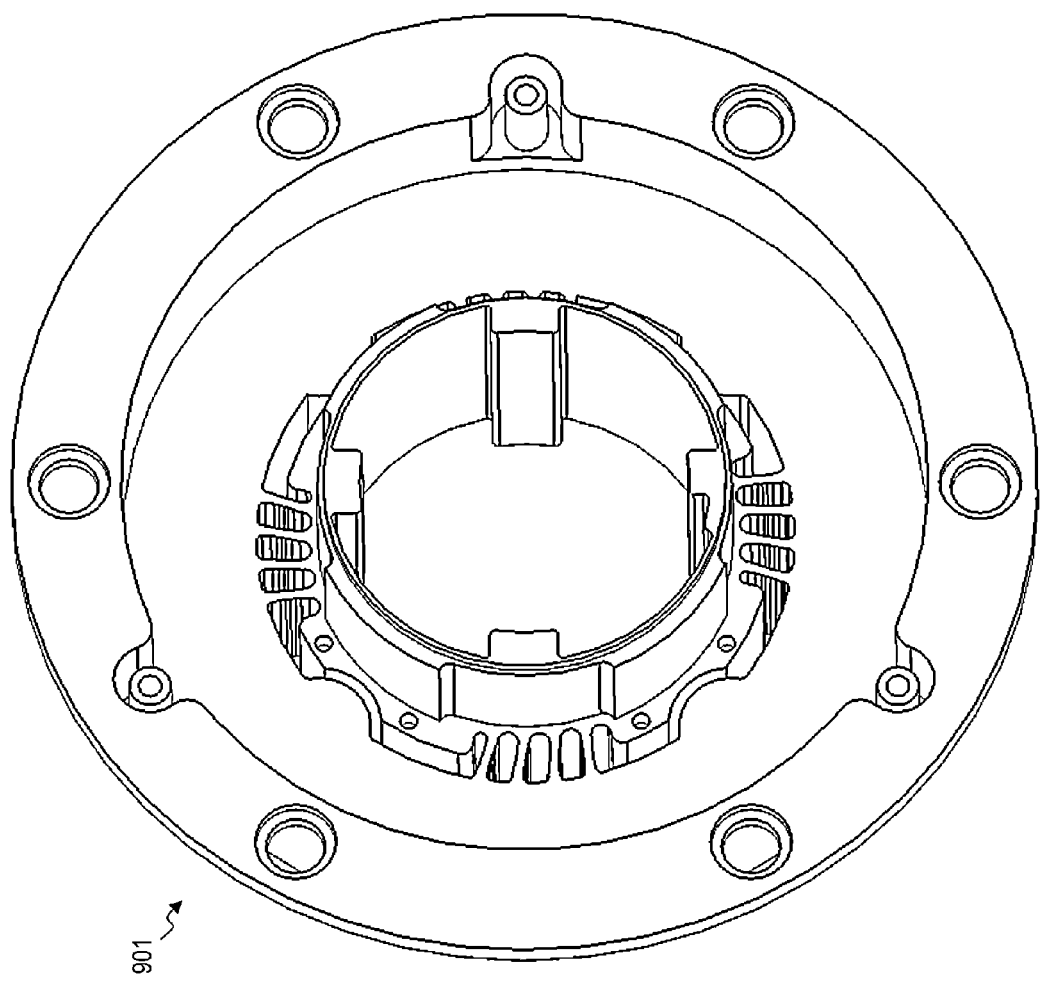
FIG. 9J is a backside isometric view of torque-measuring cassette holder 901, according to some embodiments of the present invention.

FIG. 9J is a backside isometric view of torque-measuring cassette holder 901, according to some embodiments of the present invention.

In some embodiments, the present invention provides a freehub assembly for a bicycle, wherein the assembly includes: an outer freehub member configured to mount a drive gear arrangement, wherein the outer freehub member defines an interior, and wherein the drive gear arrangement is adapted to be driven by power applied by a user to pedals of the bicycle; an inner freehub member contained within the interior of the outer freehub member; a one-way drive mechanism interposed between the outer freehub member and the inner freehub member; and a torque sensing arrangement on the outer freehub member, wherein the torque sensing arrangement is configured and arranged to sense torque transmitted from the outer freehub member to the inner freehub member of the freehub assembly through the one-way drive mechanism. Some embodiments further include an electronics assembly interconnected with the torque sensing arrangement, wherein the electronics assembly receives signals from the torque sensing arrangement corresponding to torque experienced by the outer freehub member upon application of power by a user to the drive gear arrangement, processing the signals to create torque data, and transmitting the processed torque data to a receiver. In some embodiments, the drive gear arrangement defines a cavity positioned adjacent the outer freehub member, and wherein the electronics assembly is housed within the cavity. In some embodiments, the electronics assembly is packaged into a rear disc mounted to an axially inner most portion of the freehub assembly. In some embodiments, the torque sensing arrangement comprises at least one torque sensing element mounted to the outer freehub member. In some embodiments, the torque sensing element comprises at least one strain gauge secured to the outer freehub member. In some embodiments, the at least one strain gauge comprises a plurality of strain gauges circumferentially spaced from one another around an outside of the outer freehub member. In some embodiments, the at least one strain gauge is housed within the interior of the outer freehub member. In some embodiments, the at least one strain gauge comprises a plurality of strain gauges circumferentially disposed around an inner wall of the outer freehub member that defines the interior of the outer freehub member. In some embodiments, the plurality of strain gauges are spaced at 90 degrees from one another about a circumference of the outer freehub member. In some embodiments, the outer freehub member includes a plurality of splines configured to couple the outer freehub member to the drive gear arrangement, and wherein the outer freehub member includes at least one recessed area for receiving the at least one strain gauge. In some embodiments, the outer freehub member comprises a two-piece construction having an inside member and an outside member, and wherein the torque sensing element is secured to the outside member of the outer freehub member.

In some embodiments, the present invention provides a power-sensing drive assembly for use with a user-powered apparatus having a power input arrangement, comprising: a freehub assembly adapted to be driven by the power input arrangement, wherein the freehub assembly includes an outer freehub member configured to mount a component of the power input arrangement, wherein the outer freehub member defines an interior; an inner freehub member contained within the interior of the outer freehub member; and a one-way drive mechanism interposed between the outer freehub member and the inner freehub member; a torque sensing arrangement on the outer freehub member, wherein the torque sensing arrangement is configured and arranged to sense torque applied by a user to the power input arrangement; and an electronics assembly interconnected with the torque sensing arrangement, wherein the electronics assembly receives signals from the torque sensing assembly corresponding to torque experienced by the outer freehub member upon application of power by a user to the power input arrangement. In some embodiments, the power input arrangement defines an internal cavity, and wherein the electronics assembly is contained within the cavity. In some embodiments, the outer freehub member includes an inner surface and an outer surface, wherein the inner surface defines the interior of the outer freehub member. In some embodiments, the torque sensing arrangement is secured to the outer surface of the outer freehub member. In some embodiments, the torque sensing arrangement is secured to the inner surface of the outer freehub member. In some embodiments, the electronics assembly comprises a rear disc mounted at an axially innermost portion of the power input arrangement. In some embodiments, the torque sensing arrangement comprises at least one torque sensing element. In some embodiments, the at least one torque sensing element comprises a strain gauge. In some embodiments, the at least one torque sensing element comprises a plurality of strain gauges circumferentially mounted about a portion of the outer freehub member.

In some embodiments, the present invention provides an apparatus that includes a cassette holder (such as 201 or 301) that fits on a rear-wheel freehub of a bicycle and that holds one or more sprocket cassettes and that exhibits a measurable rotational displacement representative of a torque between the freehub and the one or more sprocket cassettes.

In some embodiments of the apparatus, wherein the freehub has a rotational axis, and wherein the cassette holder includes:
an inner tubular structure that conforms to the freehub,
an outer tubular structure that conforms to the one or more sprocket cassettes, and
a plurality of ribs that each have a length dimension in a rib-length direction parallel to the rotational axis, a rib-width dimension in a width direction perpendicular to the length direction and extending from a line at a shorter radial distance from the rotational axis and a line at a longer radial distance from the rotational axis, and a minimum rib-thickness dimension in a thickness direction perpendicular to the length direction and perpendicular to the width direction, wherein the length dimension is greater than the width dimension and the width dimension is greater than the thickness dimension.

In some embodiments, the present invention provides an apparatus that includes a torque-measurement device that has a rotational axis, and wherein the torque-measurement device includes:
an inner tubular structure,
an outer tubular structure, and
a plurality of ribs that each have a length dimension in a rib-length direction parallel to the rotational axis, a rib-width dimension in a width direction perpendicular to the length direction and extending from a line at a shorter radial distance from the rotational axis and a line at a longer radial distance from the rotational axis, and a minimum rib-thickness dimension in a thickness direction perpendicular to the length direction and perpendicular to the width direction, wherein the length dimension is greater than the width dimension and the width dimension is greater than the thickness dimension,
wherein each of the plurality of ribs has a center plane that lies in the rib-length direction and the rib-width direction, and
wherein a torque applied between the inner tubular structure and the outer tubular structure results in an angular displacement of the inner tubular structure relative to the outer tubular structure.

In some embodiments, the torque-measurement device further comprises a self-contained battery-operated rotational-displacement measuring unit that includes:
a dc electricity source,
a sensor that senses the angular displacement of the inner tubular structure relative to the outer tubular structure,
an electronic circuit operatively coupled to the sensor that generates a signal based on a magnitude of the sensed angular displacement, and
a wireless transmitter operatively coupled to transmit the signal.

In some embodiments, the present invention provides an apparatus that includes:
a first inner tubular structure having a central axis of rotation;
a second outer tubular structure surrounding the central axis of rotation, wherein at least a portion of the first inner structure is positioned within the second outer structure;
a plurality of ribs configured to connect the first tubular structure to the second tubular structure such that the second outer tubular structure and the first inner tubular structure are configured to rotate relative to each other about the central axis of rotation, wherein the plurality of ribs includes a first rib and a second rib; and
a slot formed between the first rib and the second rib, wherein the slot has a length that runs between a first end at the first rib and a second end at the second rib, wherein the slot has a first radial width at the first end and a second radial width at the second end, and wherein the first radial width is wider than a third radial width at a non-end location along the slot length.

In some embodiments, the first radial width is substantially equivalent to the second radial width. In some embodiments, the first inner tubular structure includes a plurality of spline extensions including a first spline extension at a first circumferential location of the first inner structure and a second spline extension at a second circumferential location of the first inner structure, and wherein the first end of the slot is located at the first circumferential location such that the first radial width extends into the first spline extension.

In some embodiments, the present invention provides an apparatus that includes:
a first inner tubular structure having a central axis of rotation;
a second outer tubular structure surrounding the central axis of rotation, wherein at least a portion of the first inner structure is positioned within the second outer structure; and
a plurality of ribs configured to connect the first tubular structure to the second tubular structure such that the second outer tubular structure and the first inner tubular structure are configured to rotate relative to each other about the central axis of rotation, wherein the plurality of ribs includes a first rib and a second rib, wherein the first rib has a characteristic center plane that passes through a center of the first rib, and wherein the center plane of the first rib is offset from an axis-of-rotation plane that starts at the first rib and passes through the central axis of rotation. In some embodiments, the first rib has a first width such that the axis-of-rotation plane lies within the first width of the first rib.

In some embodiments, the present invention provides an apparatus that includes:
a first inner tubular structure having a central axis of rotation;
a second outer tubular structure surrounding the central axis of rotation, wherein at least a portion of the first inner structure is positioned within the second outer structure; and
a plurality of ribs configured to connect the first tubular structure to the second tubular structure such that the second outer tubular structure and the first inner tubular structure are configured to rotate relative to each other about the central axis of rotation, wherein the plurality of ribs includes a first subset of ribs and a second subset of ribs, wherein the first subset of ribs is separated from the second subset of ribs by a first circumferential distance, wherein the first subset of ribs includes a first rib and a second rib, wherein the second subset of ribs includes a third rib and a fourth rib, wherein the first rib is at a second circumferential distance from the second rib, and wherein the first circumferential distance is larger than the second circumferential distance. In some embodiments, the first rib has a characteristic center plane that passes through a center of the first rib, and wherein the center plane of the first rib is offset from an axis-of-rotation plane that starts at the first rib and passes through the central axis of rotation.

In some embodiments, the present invention provides an apparatus that includes:

a first inner tubular structure having a central axis of rotation;

a second outer tubular structure surrounding the central axis of rotation, wherein at least a portion of the first inner structure is positioned within the second outer structure, wherein the second outer tubular structure includes a plurality of grooves configured to provide a connection between the apparatus and one or more sprockets; and a plurality of ribs configured to connect the first tubular structure to the second tubular structure such that the second outer tubular structure and the first inner tubular structure are configured to rotate relative to each other about the central axis of rotation, wherein the plurality of ribs includes a first subset of ribs and a second subset of ribs, wherein the first subset of ribs is separated from the second subset of ribs by a first circumferential distance, wherein the first subset of ribs includes a first rib and a second rib, wherein the second subset of ribs includes a third rib and a fourth rib, wherein the first rib is at a second circumferential distance from the second rib, and wherein the first circumferential distance is larger than the second circumferential distance. Some embodiments further include a plurality of pins located outside of the second outer tubular structure, wherein the plurality of pins are configured to provide a connection between the apparatus and one or more sprockets.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
a torque-measurement device that has a rotational axis and that is arranged to make a measurement that measures only a torque force around the axis, wherein the torque-measurement device includes:
an inner tubular structure,
an outer tubular structure, and
a plurality of ribs coupled between the inner tubular structure and the outer tubular structure, wherein each respective one of the plurality of ribs is connected to the inner tubular structure and to the outer tubular structure and has:
a respective rib-length dimension in a length direction parallel to the rotational axis,
a respective rib-width dimension in a respective width direction perpendicular to the length direction and extending in a respective plane from a respective first geometric line that is parallel to the rotational axis and that lies within the respective rib next to a minimum outside radial dimension of the inner tubular structure to a respective second geometric line that is parallel to the rotational axis and that lies within the respective rib next to a maximum inside radial dimension of the outer tubular structure, and
a respective rib-thickness dimension in a thickness direction perpendicular to the length direction and perpendicular to the width direction,
wherein the rib-length dimension is greater than the rib-width dimension, and wherein the rib-width dimension is greater than the rib-thickness dimension, and
wherein a torque applied between the outer tubular structure and the inner tubular structure results in an angular displacement of the outer tubular structure relative to the inner tubular structure.

2. The apparatus of claim 1, further comprising a third tubular structure, wherein the torque-measurement device is affixed to the third tubular structure.

3. The apparatus of claim 1, wherein the torque-measurement device further includes a strain gauge that measures the torque force around the axis.

4. The apparatus of claim 1, wherein each of the plurality of ribs is tilted such that the respective plane of each of the plurality of ribs does not pass through the rotational axis.

5. The apparatus of claim 1, wherein the respective plane of each of the plurality of ribs passes through the rotational axis.

6. The apparatus of claim 1, wherein the outer tubular structure remains concentric with the inner tubular structure during the angular displacement of the outer tubular structure relative to the inner tubular structure.

7. The apparatus of claim 1, further comprising:
a bicycle having a frame, a front wheel, a rear wheel having a freehub, and a sprocketed pedal crank coupled to the rear wheel by a chain, wherein the torque-measurement device is configured to be affixed to the freehub.

8. The apparatus of claim 1, further comprising:
a bicycle having a frame, a front wheel, a rear wheel having a freehub, and a sprocketed pedal crank coupled to the rear wheel by a chain, wherein the inner tubular structure of the torque-measurement device is configured to fit as a cassette on the freehub.

9. The apparatus of claim 1, further comprising:
a bicycle having a frame, a front wheel, a rear wheel having a sprocket cluster and a freehub, and a sprocketed pedal crank coupled to the rear wheel by a chain, wherein the torque-measurement device is mounted between the sprocket cluster and the freehub, and wherein the sprocket cassette is affixed to the outer tubular structure of the torque-measurement device.

10. The apparatus of claim 1, further comprising:
a bicycle having a frame, a front wheel, a rear wheel having a sprocket cluster and a freehub, and a sprocketed pedal crank coupled to the rear wheel by a chain, wherein the sprocket cluster comprises the outer tubular structure of the torque-measurement device.

11. The apparatus of claim 1, further comprising:
a bicycle having a frame, a front wheel, a rear wheel having a sprocket cluster and a freehub, and a sprocketed pedal crank coupled to the rear wheel by a chain, wherein the sprocket cluster includes a single-piece sprocket cassette, and wherein the single-piece sprocket cassette includes a plurality of sprockets.

12. An apparatus comprising:
a torque-measurement device that has a rotational axis, wherein the torque-measurement device includes:
an inner tubular structure,
an outer tubular structure, and
a plurality of ribs coupled between the inner tubular structure and the outer tubular structure, wherein each respective one of the plurality of ribs has:

a respective rib-length dimension in a length direction parallel to the rotational axis, a respective rib-width dimension in a respective width direction perpendicular to the length direction and extending in a respective plane from a respective first geometric line that is parallel to the rotational axis and that lies within the respective rib next to a minimum outside radial dimension of the inner tubular structure to a respective second geometric line that is parallel to the rotational axis and that lies within the respective rib next to a maximum inside radial dimension of the outer tubular structure, and a respective rib-thickness dimension in a thickness direction perpendicular to the length direction and perpendicular to the width direction, wherein the rib-length dimension is greater than the rib-width dimension, wherein a torque applied between the outer tubular structure and the inner tubular structure results in an angular displacement of the outer tubular structure relative to the inner tubular structure, and wherein the torque-measurement device further comprises a self-contained rotational-displacement measuring unit that includes:

an electricity source, a sensor configured to sense the angular displacement of the inner tubular structure relative to the outer tubular structure, an electronic circuit operatively coupled to the sensor and to the electricity source, wherein the circuit generates a signal based on a magnitude of the sensed angular displacement, and a wireless transmitter operatively coupled to the electronic circuit and configured to wirelessly transmit the signal.

13. The apparatus of claim 12, further comprising:
a bicycle having a frame, a front wheel, a rear wheel having a freehub, and a sprocketed pedal crank coupled to the rear wheel by a chain, wherein the torque-measurement device is configured to be affixed to the freehub.

14. The apparatus of claim 12, further comprising:
a bicycle having a frame, a front wheel, a rear wheel having a freehub, and a sprocketed pedal crank coupled to the rear wheel by a chain, wherein the inner tubular structure of the torque-measurement device is configured to fit as a cassette on the freehub.

15. The apparatus of claim 12, wherein the electricity source is contained in a space between the inner tubular structure and the outer tubular structure.

16. The apparatus of claim 12, wherein the electricity source is outside of a space between the inner tubular structure and the outer tubular structure.

17. A method for making a torque-measurement device that has a rotational axis and that is arranged to make a measurement that measures only a torque force around the axis, the method comprising:
forming a single block of metal to form an inner tubular structure, an outer tubular structure, and a plurality of ribs coupled between the inner tubular structure and the outer tubular structure, wherein each one of the plurality of ribs is connected to the inner tubular structure and to the outer tubular structure and has:
a respective rib-length dimension in a length direction parallel to the rotational axis,
a respective rib-width dimension in a respective width direction perpendicular to the length direction and extending in a respective plane from a respective first geometric line that is parallel to the rotational axis and that lies within the respective rib next to a minimum outside radial dimension of the inner tubular structure to a respective second geometric line that is parallel to the rotational axis and that lies within the respective rib next to a maximum inside radial dimension of the outer tubular structure, and
a respective rib-thickness dimension in a thickness direction perpendicular to the length direction and perpendicular to the width direction, wherein the rib-length dimension is greater than the rib-width dimension, and wherein the rib-width dimension is greater than the rib-thickness dimension.

18. The method of claim 17, wherein the forming of the single block of metal includes casting the single block of metal.

19. The method of claim 17, wherein the forming of the single block of metal includes milling the single block of metal, and wherein the milling includes:
undercutting an inner perimeter of the torque-measurement device,
leaving a front stiffening wall of the outer tubular structure completely detached from a portion of the plurality of ribs, and
leaving an outer perimeter wall to connect the front stiffening wall to an outer rib-support structure of the outer tubular structure.

20. A method for measuring torque comprising:
providing a torque-measurement device having a rotational axis and that is arranged to make a measurement that measures only a torque force around the axis, wherein the torque-measurement device includes:
an inner tubular structure,
an outer tubular structure, and
a plurality of ribs coupled between the inner tubular structure and the outer tubular structure, wherein each one of the plurality of ribs is connected to the inner tubular structure and to the outer tubular structure and has:
a respective rib-length dimension in a length direction parallel to the rotational axis,
a respective rib-width dimension in a respective width direction perpendicular to the length direction and extending in a respective plane from a respective first geometric line that is parallel to the rotational axis and that lies within the respective rib next to a minimum outside radial dimension of the inner tubular structure to a respective second geometric line that is parallel to the rotational axis and that lies within the respective rib next to a maximum inside radial dimension of the outer tubular structure, and
a respective rib-thickness dimension in a thickness direction perpendicular to the length direction and perpendicular to the width direction, wherein the rib-length dimension is greater than the rib-width dimension, and wherein the rib-width dimension is greater than the rib-thickness dimension;
applying a first torque between the outer tubular structure and the inner tubular structure;
sensing a displacement of the inner tubular structure relative to the outer tubular structure during the applying of the first torque; and
determining a value of the first torque based on the sensed displacement.

* * * * *